(12) United States Patent
Melloni et al.

(10) Patent No.: US 7,302,135 B2
(45) Date of Patent: Nov. 27, 2007

(54) WAVEGUIDE BENDS AND DEVICES INCLUDING WAVEGUIDE BENDS

(75) Inventors: Andrea Melloni, Milan (IT); Raffaella Costa, Milan (IT); Federico Carniel, Milan (IT)

(73) Assignee: Pirelli & C. S.p.A., Milan (IT)

( * ) Notice: Subject to any disclaimer, the term of this patent is extended or adjusted under 35 U.S.C. 154(b) by 192 days.

(21) Appl. No.: 10/479,579

(22) PCT Filed: May 28, 2002

(86) PCT No.: PCT/EP02/05848

§ 371 (c)(1),
(2), (4) Date: Jun. 10, 2004

(87) PCT Pub. No.: WO02/099484

PCT Pub. Date: Dec. 12, 2002

(65) Prior Publication Data

US 2004/0234199 A1 Nov. 25, 2004

Related U.S. Application Data

(60) Provisional application No. 60/295,870, filed on Jun. 6, 2001.

(30) Foreign Application Priority Data

Jun. 5, 2001 (EP) .................................. 01304890

(51) Int. Cl.
*G02B 6/02* (2006.01)

(52) U.S. Cl. ............................... 385/28; 385/32; 385/50

(58) Field of Classification Search .................. 385/28, 385/32, 50
See application file for complete search history.

(56) References Cited

U.S. PATENT DOCUMENTS 4,070,094 A * 1/1978 Martin .......................... 385/8
4,262,992 A * 4/1981 Berthold, III ................. 385/15
5,243,672 A 9/1993 Dragone (Continued)

FOREIGN PATENT DOCUMENTS

EP 0 668 517 A1 8/1995

OTHER PUBLICATIONS

Tsutomu Kitoh, et al., "Bending-Loss Reduction in Silica-Based Waveguides by Using Lateral Offsets"., vol. 13, No. 4, pp. 555-562 (1995).

(Continued)

*Primary Examiner*—K. Cyrus Kianni
(74) *Attorney, Agent, or Firm*—Finnegan, Henderson, Farabow, Garrett & Dunner, L.L.P.

(57) ABSTRACT

Waveguide bends are specially designed according to a matching condition in order to suppress mode distortion and other undesirable effects. The bend is structured having regard to its length and curvature to ensure that at its end the first and second bend modes are substantially in phase with each other having completed approximately an integer number of beats. By being in phase at the end of the bend, the two modes are able to properly reconstruct the first mode of the straight waveguide and propagate on with a minimum of distortion, whether it be into a straight section, a further curved section of arbitrary curvature, into a free space propagation region and the like. This approach suppresses mode distortion, transition losses and other negative effects of waveguide bends. Device applications include couplers, Y-branches and Mach-Zehnder interferometers, all of which include waveguide bends.

28 Claims, 16 Drawing Sheets

U.S. PATENT DOCUMENTS

| | | | |
|---|---|---|---|
| 6,229,943 B1* | 5/2001 | Okayama | 385/39 |
| 6,442,321 B1* | 8/2002 | Berini | 385/130 |
| 6,465,153 B1* | 10/2002 | Kewitsch et al. | 430/290 |
| 6,580,850 B1* | 6/2003 | Kazarinov et al. | 385/28 |
| 2003/0059147 A1* | 3/2003 | Berini | 385/2 |
| 2003/0118279 A1* | 6/2003 | Izhaki et al. | 385/21 |
| 2004/0008943 A1* | 1/2004 | Berini | 385/39 |

OTHER PUBLICATIONS

T. Hirono, et al., "Optimized Offset to Eliminate First-Order Mode Excitation at the Junction of Straight and Curved Multimode Waveguides"., IEEE Phototronics Technology Letters, vol. 10, No. 7, pp. 982-984 (1998).

Andrea Melloni, et al., "Determination of Bend Mode Characteristics in Dielectric Waveguides"., Journal of Lightwave Technology, vol. 19, No. 4, pp. 571-577 (2001).

Andrea Melloni, et al., "An Effective Method for the Analysis of Bent Dielectric Waveguides". LEOS '99, pp. 641-642 (1999).

Lucas B. Soldano et al., "Optical Multi-Mode Interference Devices Based on Self-Imaging: Principles and Applications"., Journal of Lightwave Technology, vol. 13, No. 4, pp. 615-627 (1995).

S.J. Garth., "Modes on a Bent Optical Waveguide"., IEEE Proceedings, vol. 134, Pt J, No. 4, pp. 221-229, (1987).

C.L. Xu, et al., "Efficient and Accurate Vector Mode Calculations by Beam Propagation Method", Journal of Lightwave Technology, vol. 11, No. 7., pp. 1209-1215, (1993).

Simon J. Hewlett et al., "Fourier Decomposition Method Applied to Mapped Infinite Domains: Scalar Analysis of Dielectric Waveguides Down to Modal Cutoff"., Journal of Lightwave Technology, vol. 13, No. 3, pp. 375-383, (1995).

R. Baets et al., "Loss Calculation and Design of Arbitrarily Curved Integrated-Optic Waveguides"., J. Opt. Soc. Am., vol. 73, No. 2, pp. 177-182, (1983).

E.C.M. Pennings et al., Low-Loss Bends in Planar Opitical Ridge Waveguides, Electronics Letters, vol. 24, No. 16, pp. 998-999, (1988).

Ernst-Georg Neumann et al. "Curved Dielectric Optical Waveguides with Reduced Transition Losses", IEE Proc., vol. 129, Pt.H, No. 5, pp. 278-280, (1982).

Weyl-kuo Wang, "Phase Compensation of Bent Silica-Glass Optical Channel Waveguide Devices by V ector-Wave Mode-Matching Method"., Journal of Lightwave Technology, vol. 15, No. 3, pp. 538-545, (1997).

D. Rowland, "Nonperturbative Calculation of Bend Loss for a Pulse in a Bent Planar Waveguide"., IEE Proc-Optoelectronics, vol. 144, No. 2, pp. 91-96 (1997).

C.F. Janz et al. "Bent Waveguide Couplers for (De) Multiplexing of Arbitrary Broadly-Separated Wavelengths Using Two-Mode Interference", IEEE Photonics Technology Letters, vol. 7, No. 9 Sep. 1995.

* cited by examiner

WAVEGUIDE BENDS AND DEVICES INCLUDING WAVEGUIDE BENDS

CROSS REFERENCE TO RELATED APPLICATIONS

This application is a national phase application based on PCT/EP02/05845, filed May 28, 2002, the content of which is incorporated herein by reference, and claims the priority of European Patent Application 01304890.5, filed Jun. 5, 2001, the content of which is incorporated herein by reference, and claims the benefits of U.S. Provisional Application No. 60/295,870, filed Jun. 6, 2001, the content of which is incorporated herein by reference.

BACKGROUND OF THE INVENTION

1. Field of the Invention

The invention relates generally to waveguides including bends, more especially but not exclusively to optical waveguides, such as planar waveguides, and to optical devices incorporating waveguides with bends.

2. Description of the Related Art

Planar waveguides are used extensively in optical communications for optical switching, multiplexing and demultiplexing. Many basic optical components and devices, such as modulators, couplers and splitters, incorporate waveguide bends. Moreover, to achieve high density of integration of optical devices on a single chip or substrate, it is often necessary to interconnect the devices with waveguide bends. The size and insertion loss of the waveguide bends ultimately determine the maximum density of devices that can be integrated into an optical circuit of finite size.

It is well known that the field distribution of a fundamental mode in a curved waveguide is different from that in a straight waveguide. The field mismatch between the respective fundamental modes results in transition losses and in excitation of higher-order modes at the junctions between straight and curved waveguides.

In the prior art, one proposed solution to this problem is to offset the curved waveguide at its junction with an adjoining straight (or curved) waveguide, with the offset being towards the centre of curvature of the curved waveguide [1-4]. A number of examples of such prior art offset waveguide structures are now described.

FIG. 1 of the accompanying drawings shows a prior art structure as envisaged by Kitoh et. al. [2] comprising a curved waveguide 10 with a constant radius of curvature 'r' coupled to a straight waveguide 20. The centre line 14 of the curved waveguide 10 is laterally offset by a distance 'd' from the centre line 16 of the straight waveguide 20, with the offset being towards the centre of curvature of the curved waveguide 10.

FIG. 2 of the accompanying drawings shows an S-shaped waveguide described by Kitoh et. al. [2] which may be considered as a combination of two of the elements shown in FIG. 1. The S-shaped waveguide comprises an input waveguide 24 and an output waveguide 26 that extends parallel to and laterally displaced from the input waveguide 24. The input waveguide 24 is coupled to a first curved waveguide section 28 which is laterally offset from the input waveguide by a distance 'd'. The first curved waveguide section 28 is further coupled to a second curved waveguide section 30 of opposite curvature. The offset between the first and second curved waveguide sections 28 and 30 is '2d'. The second curved waveguide 30 section is further coupled to the output waveguide 26. The offset between the second curved waveguide 30 and the output waveguide 26 is 'd'. The first and second curved waveguide sections 28 and 30 have the same radius of curvature.

FIG. 3 of the accompanying drawings shows a waveguide directional coupler described by Kitoh et. al. [2]. The waveguide directional coupler has four arms 47. Each arm 47 consists of a first straight section 44 coupled to a first curved section 45 which is further coupled to a second curved section 46 which, in turn, is further coupled to a straight central section. The curved sections 45 and 46 are offset by a distance '2d' to each other. The straight sections 44 and 49 are offset to curved sections 45 and 46 respectively by distances 'd'. Each curved section 45 and 46 has the same radius of curvature.

Reference [2] describes how the waveguide junction offsets can be dimensioned to minimize transition losses. However, with this transition loss optimization, the offsets distort the optical field as it travels between the straight and curved sections and excite a small amount of radiative modes.

A different approach for optimizing junction offsets is taken in references [3] and [4] which describe how the waveguide junction offsets can be dimensioned to minimize field distortion. However, with this approach the transition losses are higher.

Although the provision of offsets is effective in theory, in practice it is demanding to fabricate waveguides with the proposed offsets, since low dimensional tolerances are needed.

SUMMARY OF THE INVENTION

According to a first aspect of the invention there is provided a waveguide for guiding a field therealong, the waveguide comprising a bend bounded by an input end and an output end, wherein the field in the bend is describable by first and second bend modes which are in phase at the input end but propagate at different velocities through the bend, thereby coming out of phase and into phase with each other in beats, wherein the bend is structured having regard to its length and curvature to ensure that at the output end the first and second bend modes are substantially in phase with each other over a desired wavelength range of the optical field having completed approximately an integer number of beats.

The basic structure of a waveguide bend is of course well known. However, the bend of the first aspect of the invention differs from a conventional waveguide bend in that there is a special shaping and dimensioning of the bend that allows the optical modes to propagate through the bend substantially undistorted.

The underlying idea behind the invention is to make a waveguide bend comprising one or more curved sections such that, at the end of the bend, the two orthogonal modes are in phase. By being in phase at the end of the bend, the two modes are able to properly reconstruct the first mode of the straight waveguide and propagate on with a minimum of distortion, whether it be into a straight section, a further curved section of arbitrary curvature, into a free space propagation region or whatever. Typically, this is achieved by making a bend having a length '1' equal to an integer number of beat lengths $L_b$. A waveguide bend or single curved portion that satisfies this condition is hereinafter referred to as a matched bend or curved portion.

The utility of the invention is considerably enhanced by the fact that a matched bend is well matched over a relatively large wavelength range. This is because the beat length changes only very weakly with wavelength. This is quite surprising, since the propagation constants, coupling integral and other relevant mode parameters all vary with wavelength relatively strongly. However, although the mode parameters vary with wavelength, they do so in a very similar manner so that the net result in terms of beat length variation is quite small. It is thus possible to provide close matching of a bend for a large range of wavelengths, which is of course a great advantage, for example for wavelength division multiplexed systems. For example, matching can be provided across the whole of the third telecommunications window.

The proposed matched bend approach can be used to suppress mode distortion, transition losses and other negative effects of waveguide bends, without the need for inserting the small lateral offsets of the prior art [1-4]. Waveguide bends can thus be inserted into optical circuits where desired, e.g. to optimize packing density, without concern for mode distortion or other negative effects on the components of the circuit adjacent to the bends.

In embodiments of the invention, the first and second bend modes have a phase mismatch of less than one of 30, 20, 10, 5, 2 and 1 degrees at the output end of the curved portion over the desired wavelength range. The desired wavelength range may be any of 1, 2, 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 350, 400 and 500 nm. These desired wavelength ranges may span any wavelength range at wavelengths of 300 nm to 2000 nm, more particularly any wavelengths of 1000 to 1800 nm, still more particularly any wavelengths of 1200 to 1700 nm.

In embodiments of the invention, the waveguide is a planar waveguide, ridge waveguide, diffused waveguide, or any other waveguide fabricated using a substrate. The invention may also find application in optical fiber waveguides.

The invention is applicable to multimode as well as monomode waveguides.

It is noted that the second bend mode may be leaky.

The integer number of beats may vary. Example values are 1, 2, 3, 4 and 5.

The waveguide may be shaped to provide a U-bend or an L-bend. In general the bend may describe any desired angular deviation.

A design rule for a bend of arbitrary curvature characterized by a radius of curvature R that is a function of angle $\theta$ through the bend is such that the curved portion of the bend should substantially satisfy the following matching condition:

$$\int_{-\theta/2}^{\theta/2} \sqrt{R^2(\theta)C_1 + C_2}\, d\theta = 2N\pi$$

where $C_1 = (\beta_0 - \beta_1)^2;$ $C_2 = 4\beta_0\beta_1 c_{10}^2;$ $\beta_0$ & $\beta_1$ are respective phase constants of first and second straight modes;

$c_{10}$ is a coupling coefficient indicative of coupling induced by the bend between the first and second straight modes; and N is the integer number of beats.

It is noted that the invention is applicable to waveguide bends not only with varying bending radius, but also to waveguide bends whose width varies along the bend.

A design rule for one embodiment is valid in the case that the bend comprises an arcuate curved portion. Namely, where R is a constant over at least one arcuate part of the bend, the curved portion of the bend should substantially satisfy the following matching condition:

$$R = \sqrt{\frac{\left(\frac{2N\pi}{\theta}\right)^2 - C_2}{C_1}}$$

The matching condition may be deemed to be substantially satisfied when N is within one of 10%, 8%, 6%, 4%, 2%, 1%, 0.5% and 0.25% of an integer value over the desired wavelength range.

The matched bend may comprise multiple curves. The individual curves may each themselves satisfy the matching condition. Alternatively, the individual curves may be unmatched, but collectively form a matched bend.

In the case of multiple curves these can be different in terms of dimensions, shape or any other parameter relevant for the matching. This is easy to achieve based on the use of the design equations detailed herein. To give a concrete example, bend matching in an arrayed waveguide grating should be possible using the theory presented herein, whereas this would be inconceivable to achieve otherwise. Descriptions of arrayed waveguide gratings can be found in the literature, for example in a number of US patents issued in the name of Dragone as inventor, the contents of which are incorporated herein by reference.

In one embodiment, the bend is an S-bend comprising two curved portions of opposite curvature to provide a waveguide offset that connects two straight waveguide portions that extend parallel to each other. A lateral offset is useful for placement between two optical components aligned substantially in parallel with each other.

A straight portion of waveguide can be defined as a waveguide having no bend with a radius of curvature of less than one of 20, 30, 40, 50 and 100 cm.

The proposed matched bends may find application in a variety of devices. One example, is a Mach-Zehnder interferometer device comprising a first arm and a second arm, wherein at least the first arm comprises a matched bend waveguide according to the first aspect of the invention. Another example is a waveguide branch, such as a Y-branch, comprising an input waveguide and at least two output waveguides, wherein the input waveguide comprises a matched bend waveguide. A further example, is a multimode interference coupler having an input connected to a matched bend waveguide. A still further example is an arrayed waveguide grating in which at least some of the arms are matched bend waveguides. Yet another example is an arrayed waveguide grating having an input connected to at least one matched bend waveguide. Another example is a waveguide coupler comprising first and second waveguides which extend proximal to each other to form a coupling region having first and second ends, wherein the first and second waveguides include curved portions which conform to the matched bend design rules, in order to diverge from each other at the first and second ends of the coupling region More generally, further examples will be any optical circuit comprising an optical component having an input for receiving an optical signal and a matched bend waveguide connected to the input. This will be especially useful when the optical component is of a type that is sensitive to mode distortion at the input.

According to a second aspect of the invention, there is provided a method of manufacturing a waveguide for guiding an optical field therealong, the waveguide comprising a bend bounded by an input end and an output end, the method comprising: describing the optical field in the bend by first and second bend modes which are in phase at the input end but propagate at different velocities through the bend, thereby coming out of phase and into phase with each other in beats; designing the bend having regard to its length and curvature to ensure that at the output end the first and second bend modes are substantially in phase with each other having completed approximately an integer number of beats; and fabricating the waveguide.

According to a third aspect of the invention, there is provided a mode converter comprising a waveguide for guiding a field therealong, the waveguide having a bend bounded by an input end and an output end, wherein the bend is structured having regard to its length and curvature to convert an optical field received at the input end with a predictable ratio of a first power portion in a fundamental mode to a second power portion in a first leaky mode into an optical field at the output end in which a substantially all the power is in the fundamental mode and substantially none in the first leaky mode. In practice it may be sufficient that the percentage of power in the first leaky mode after mode conversion is less than one of 10%, 5%, 2% and 1% of the power in the fundamental mode.

BRIEF DESCRIPTION OF THE DRAWINGS

For a better understanding of the invention and to show how the same may be carried into effect reference is now made by way of example to the accompanying drawings in which.

DETAILED DESCRIPTION

FIRST EMBODIMENT

Figure 4:
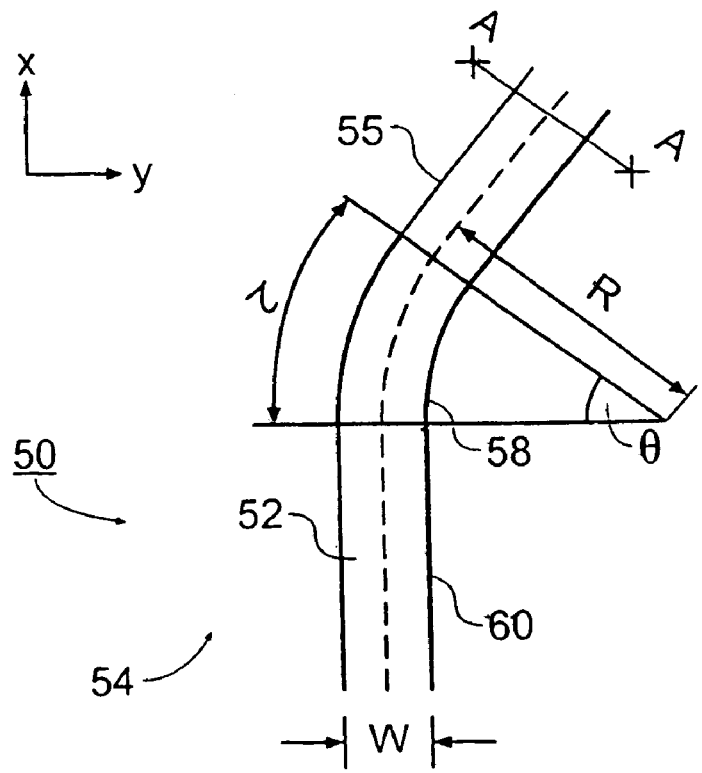
FIG. 4 is a schematic diagram of a first embodiment of the invention showing a waveguide bend.

FIG. 4 shows a plan view of a monomode waveguide 50 according to a first embodiment of the invention. The waveguide comprises a core and cladding. The waveguide is made up of a first straight section 60 extending in direction 'x' followed by a curved section 58 followed by a second straight section 55. The curved section 58 has a radius of curvature R. The radius of curvature R is measured to a centre line of the core, which is shown with a dashed line in the figure. The curved section 58 extends through an angle θ having a circumferential length 1, as measured along the centre line. The illustrated waveguide thus has an arcuate bend. In one example, R=2 mm, θ=5.5° and l=191 μm.

The basic structure of a waveguide bend is of course well known. However, the bend according to the first embodiment of the invention differs from a conventional waveguide structure in that there is a special shaping and dimensioning of the bend that allows the optical modes to propagate from the first straight section into the second straight section 55 substantially undistorted. The design rules for shaping and dimensioning the bend are described in detail further below.

Figure 1:
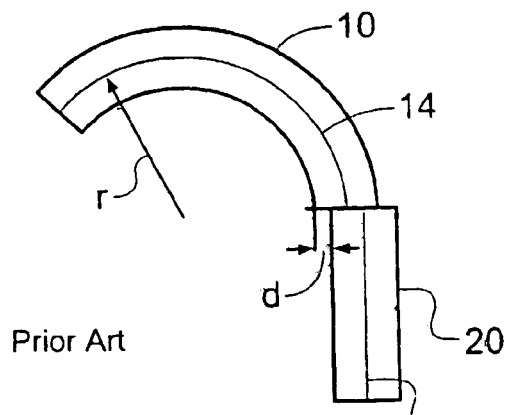
FIG. 1 is a schematic diagram of a first example waveguide from the prior art.
Figure 2:
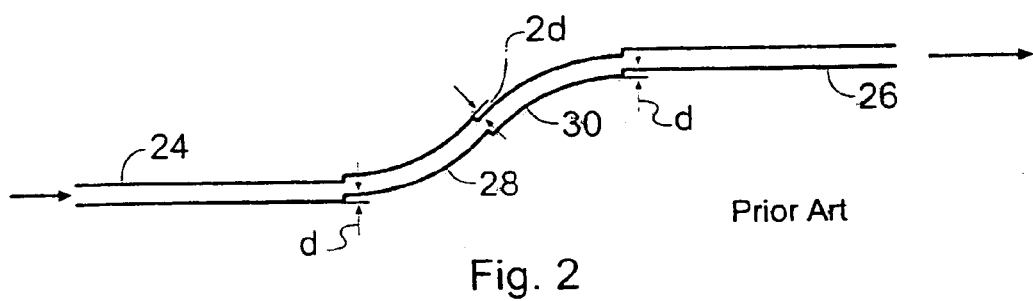
FIG. 2 is a schematic diagram of a second example waveguide from the prior art.
Figure 3:
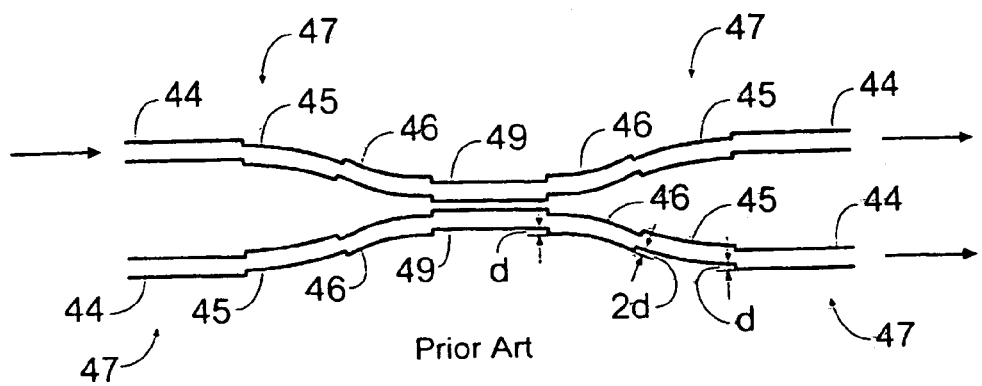
FIG. 3 is a schematic diagram of a third example waveguide from the prior art.
Figure 5:
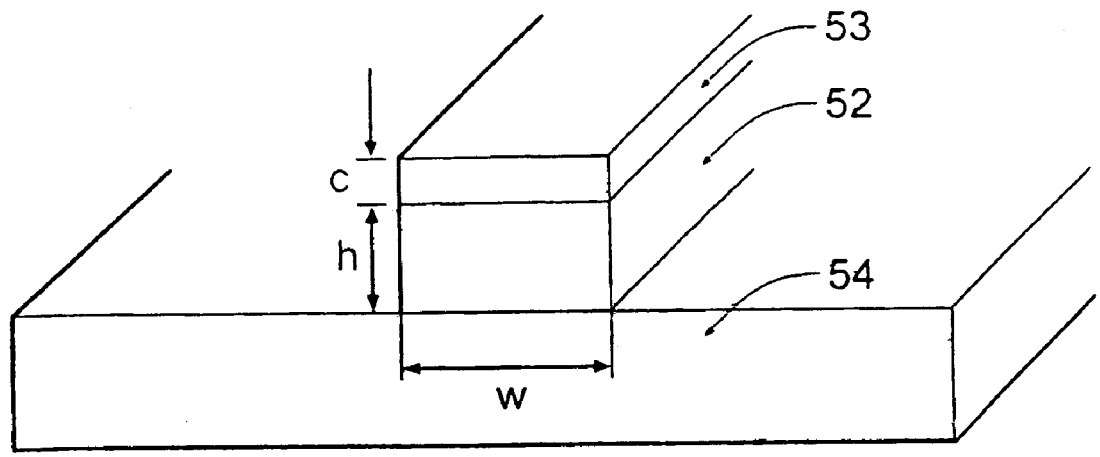
FIG. 5 is a cross-section through line A-A of FIG. 4.

FIG. 5 is a cross-section through A-A of FIG. 4. As is evident, the monomode waveguide is realized as a ridge waveguide with the core 52 arranged as a ridge on top of the cladding 54. A cap layer 53 is also provided on top of the core 52. (The cap layer may also be referred to as a cover layer or upper clad layer). An one example, the core 50 has a width w=8.5 μm and a height h=6 μm, and the cap layer has a thickness c=4 μm. If desired, the additional cap layer may be omitted. It will also be understood that illustration of a ridge waveguide is by way of example only. The waveguide may be buried, diffused or of any other kind.

The structure may be fabricated by any of several known techniques, for example sol-gel, ion-beam implantation, vacuum deposition, implantation, chemical or physical vapor deposition or ion diffusion. The core 52 is made from doped silica with refractive index n=1.4652. The cladding 54 and cap 53 is made from silica and has a refractive index n=1.4552. The refractive index difference between core and cladding Δn is thus Δn=0.69%.

The materials chosen for the core and cladding may be of any dielectric material with refractive indices that will allow light to be guided through the waveguide.

The design rules for shaping and dimensioning the bend of the first embodiment (and also waveguide bends of other embodiments) are now described. It has been shown [5, 6] that the modes of a bent waveguide can be approximated as a linear combination of the straight waveguides modes. For a monomode waveguide, it can be demonstrated that only the fundamental mode and the first leaky mode in the plane of the bend (both of the straight waveguide) are sufficient to describe the fundamental bend mode. Vice versa, the fundamental straight mode can be described as the linear combination of the fundamental bent mode and the first leaky bend mode. This is valid, separately both for TE and TM polarization.

When a straight fundamental mode enters in a bend you can imagine this mode as the sum of two modes, the two bend modes (fundamental+first leaky). These two modes are not coupled (because they are the modes of the bend waveguide) but propagate at different velocities in the bend. The two modes have different phase constants, $\beta_{B0}$ and $\beta_{B1}$, related to $\beta_0$ and $\beta_1$, the phase constants of the two straight modes, by some complex relations (see [5, 6]). This causes the total optical field to change shape as it travels through the curved waveguide section. At the beginning of the curve, the two modes are in phase with each other, but gradually dephase. At some point along the curve, provided it is sufficiently long, the two modes come back into phase with each other again. In other words, the phase difference reaches $2\pi$. The characteristic length of curved waveguide section over which a $2\pi$ phase difference will occur is determined by the difference in the phase velocities of the two modes. This length is referred to here as the beat length $L_b$. As the two bend modes propagate along the curve, they will thus come into phase periodically, after each beat length of propagation. Therefore, at each integral number of beat lengths, the optical field in the curved waveguide section will momentarily reconstruct to have the form of the optical field of the fundamental modes in a straight waveguide section, provided that the radiation losses of the leaky bend mode are not too high, i.e. provided that the bending radius is not too small.

The underlying idea behind the invention, not just the present embodiment, is to make a curve such that, at the end of the curve, the two orthogonal modes are in phase. By being in phase at the end of the curve, the mode is able to properly reconstruct the first mode of the straight waveguide and propagate on with a minimum of distortion, whether it be into a straight section, a further curved section of arbitrary curvature, a free space propagation region or whatever. Typically, this is achieved by making a curve having a length '1' equal to an integer number of beat lengths $L_b$. A curved waveguide section that satisfies this condition is hereinafter referred to as a matched bend.

This condition is now quantified in the case of an arcuate curve having a single radius of curvature R, constant width W and describing an arc of angle $\theta$, such as that illustrated in FIG. 4. In this case, the beat length is:

$$L_b = \frac{2\pi}{\beta_{B0} - \beta_{B1}} \quad (1)$$

where $$(\beta_{B0} - \beta_{B1}) = \frac{1}{R}\sqrt{R^2(\beta_0 - \beta_1)^2 + 4\beta_0\beta_1 c_{10}^2}. \quad (2)$$

as will be understood from references [5, 6] and where
$\beta_0$ & $\beta_1$ are the phase constants of the first two modes of the straight waveguide; and $c_{10}$ is the coupling coefficient between the first two modes of the straight waveguide induced by the curve.

To obtain a curve containing exactly N beat lengths, that is the matched bend condition, the condition is imposed that:

$$R\theta = NL_b \quad (3)$$

and taking into account equations (1) and (2) the optimum bending radius is found to be $$R = \sqrt{\frac{\left(\frac{2N\pi}{\theta}\right)^2 - C_2}{C_1}} \quad (4)$$

where $C_1 = (\beta_0 - \beta_1)^2$;

$C_2 = 4\beta_0\beta_1 c_{10}^2$; and

N is a positive integer that indicates the length of the curve in units of beat length.

In the more general case of a curve with variable bending radius $R=R(\theta)$, and/or a waveguide bend with varying width $W=W(\theta)$, the same procedure leads to an integral equation that relates R to $\theta$:

$$\int_{-\theta/2}^{\theta/2} \sqrt{R^2(\theta)C_1(\theta) + C_2(\theta)}\, d\theta = 2N\pi. \quad (5)$$

where the dependency of $C_1$ and $C_2$ on $\theta$ follows from taking account of the possibility of variable waveguide width, since the coefficients $\beta_0$, $\beta_1$ and $c_{10}$ are waveguide width dependent.

Figure 6:
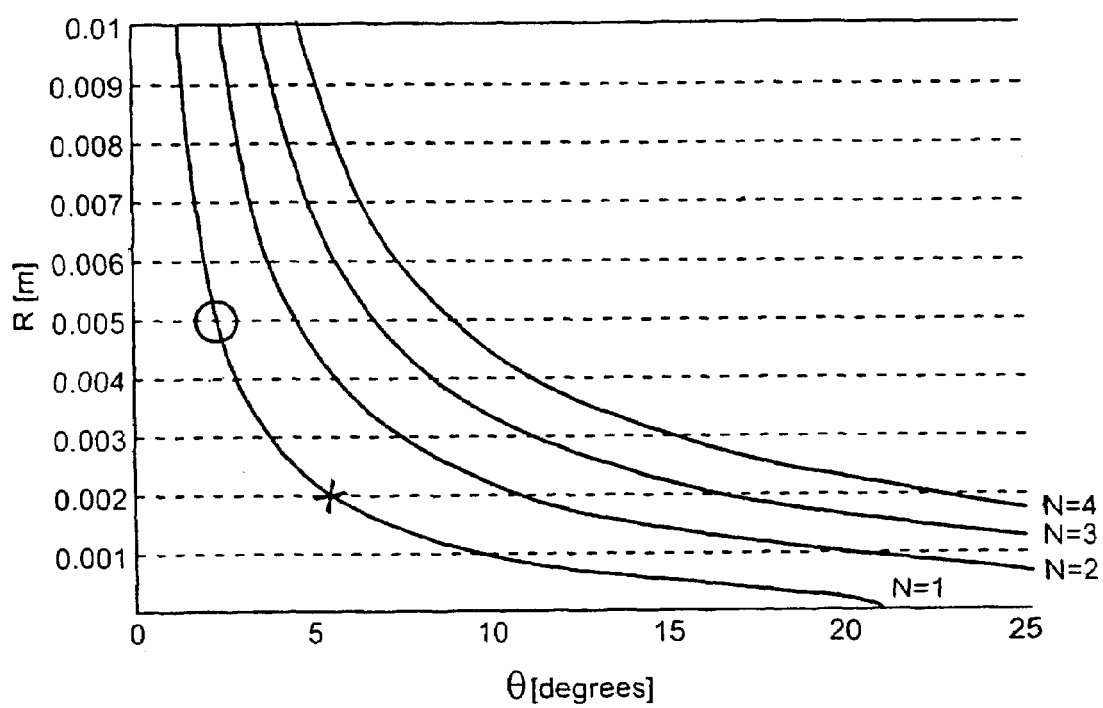
FIG. 6 is a graph of radius of curvature R in meters against angle θ in degrees.

FIG. 6 is a graph showing results for a waveguide as shown in FIG. 5, with parameter values: $c_{10}=1.4533\cdot 10^{-6}$; $\beta_0=5.9185\cdot 10^6$; and $\beta_1=5.8890\cdot 10^6$ (at a wavelength of 1550 nm). The graph refers to a bend with a constant bending radius R and constant waveguide width W. The graph plots sets of values of the radius of curvature R in meters and angle of curvature $\theta$ in degrees that satisfy equation (1) above. The graph includes four traces, one for each of N=1, 2, 3 and 4. The trace for N=1 indicates a set of values of R & $\theta$ that give a length of curved waveguide section equal to one beat length $L_b$. The traces for N=2, 3 and 4 indicate further data sets of R & $\theta$ for which the curved waveguide sections have lengths $1=2L_b$, $3L_b$ and $4L_b$ respectively.

In one example N=1, R=2 mm, $\theta=5.5°$, and $1=191$ μm. The position of this example on the graph of FIG. 6 is marked with a cross. It is noted that the same angle can be obtained by a bending radius of 4 mm and a length $1=382$ μm (two $L_b$, N=2) or more (N=3, 4 . . . ).

Figure 7:
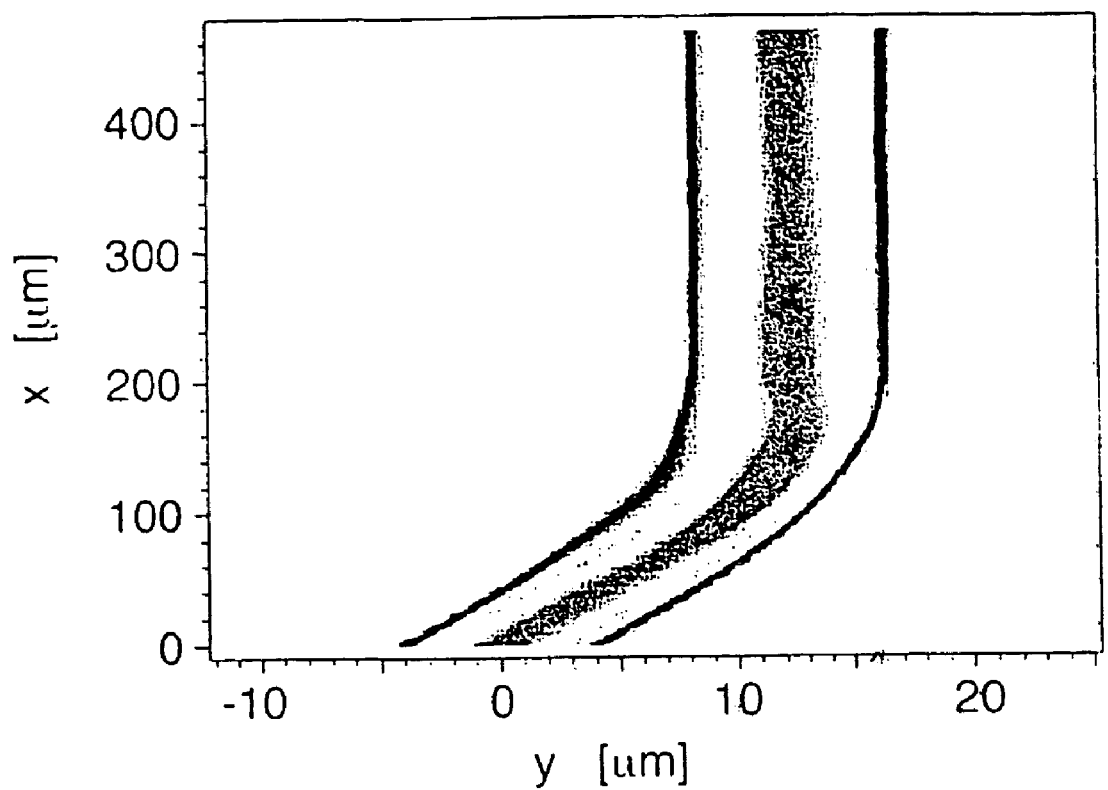
FIG. 7 shows a calculated field intensity pattern for a matched bend waveguide according to the first embodiment.
Figure 8:
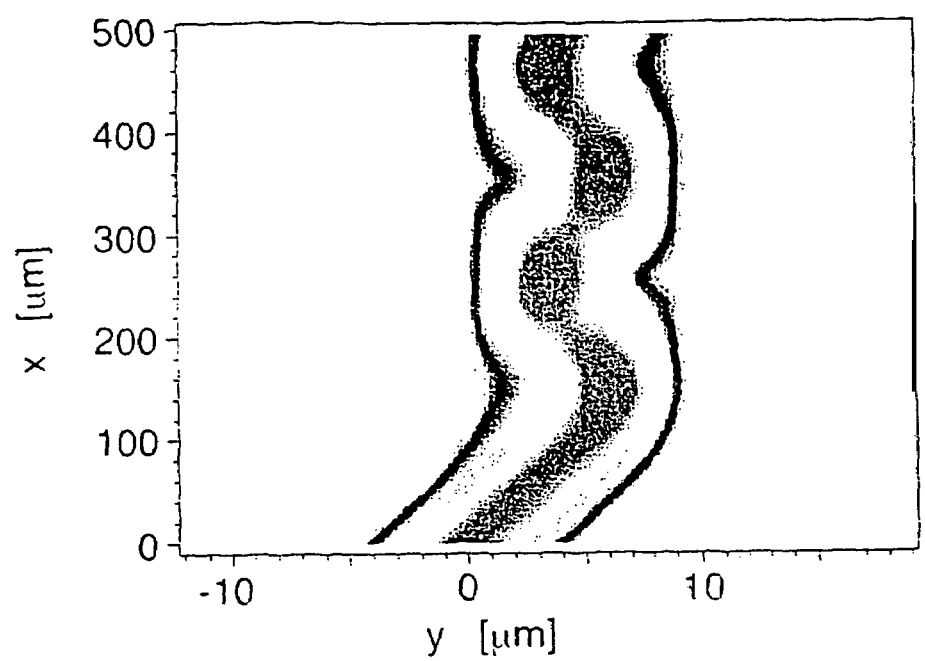
FIG. 8 shows a calculated field intensity pattern for an unmatched bend waveguide for comparison with FIG. 7.

FIGS. 7 and 8 show calculated mode patterns for two single bends having the structure shown in FIG. 4. More especially, the graphs show the intensity of the calculated optical field propagating in the bend. In the case of FIG. 7, the bend conforms to the matched bend condition set out above. For comparison, the bend of FIG. 8 is for an unmatched bend. The matched bend of FIG. 7 has R=2 mm, $\theta=5.5°$ and $1=191$ μm (N=1). The unmatched bend of FIG. 8 has R=2 mm, $\theta=2.75°$, $1=95$ μm (N=0.5).

For the matched bend of FIG. 7, some slight mode distortion is evident as the mode propagates through the curved section. However, after the end of the curved section, the mode is seen to reconstruct immediately, substantially without distortion, in the second straight section. In other words, the field pattern in the second straight section reproduces the field pattern in the first straight section, as desired.

For the unmatched bend of FIG. 8, by contrast, the mode does not reconstruct after the end of the curved section, at least not for several hundred microns of propagation included in the plot. The mode can be expected to reconstruct eventually, provided that the second straight waveguide mode radiates away completely. In addition, the unmatched bend results in significant radiation losses. For the present examples, the radiation losses of the matched bend are equal to 0.5% (0.02 dB) while those of the unmatched bend are 9.2% (0.42 dB).

In summary, the high mode distortion in and subsequent to the unmatched bend is associated with energy losses, which are of course highly undesirable for many applications. By contrast, the low distortion of a matched bend is associated with low transition losses in the bend.

Perhaps more importantly, the slow recovery of the mode after an unmatched bend can have a severe impact on the behavior or functionality of an optical component placed after an unmatched bend. Some types of optical component are highly sensitive to input mode distortion, for example splitters and components using splitters. To increase integration density it is desirable to pack components close together. However, slow recovery of the mode after a bend will mitigate against achieving high packing density, since a large distance needs to be maintained between the end of the bend and the next optical component, e.g. 500-1000 μm or even more. By contrast, the rapid mode stabilization of a matched bend allows subsequent mode-sensitive optical components to be placed close to the bend, e.g. within 100 μm or 200 μm, or even less, without problems.

Another strength of the proposed design is that it is relatively insensitive to wavelength variations. In other words a matched bend is well matched over a relatively large wavelength range. This is explained as follows. The bending radius R and the angle θ of an optimum bend depend on the beat length $L_B$ defined in equation 1 through equations 4-7, i.e. on the difference between the phase constants $\beta_{B0}$ and $\beta_{B1}$ of the bend modes. Although $\beta_{B0}$ and $\beta_{B1}$ as well as $\beta_0$ and $\beta_1$ and the coupling integral $c_{10}$ depend on wavelength, they do so in a very similar manner so that the wavelength dependence of the beat length $L_B$ is extremely weak. As a result, an optimum bend, offset or other waveguide structure is well matched over a broad wavelength region of 100 nm or more in the second or third telecommunications windows (1.3 and 1.55 μm bands). For example, it is possible to provide good matching over the whole of the third telecommunications window.

SECOND EMBODIMENT

Figure 9:
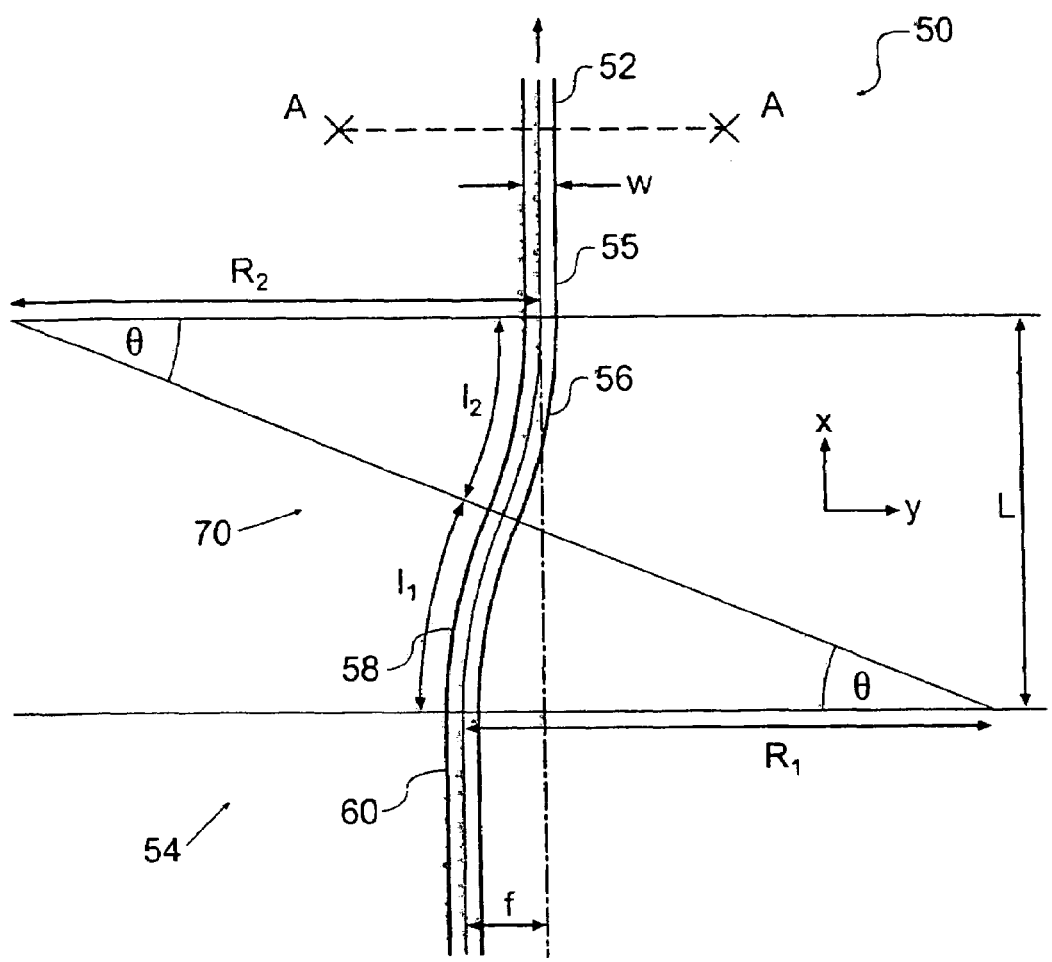
FIG. 9 is a schematic diagram of a second embodiment of the invention showing an S-bend waveguide offset.

FIG. 9 shows a plan view of a monomode waveguide 50 according to a second embodiment of the invention. The waveguide 50 comprises a core 52 and cladding 54. The waveguide 50 is made up of a first straight section 60 extending in direction 'x' followed by a first curved section 58 followed by a second curved section 56 of opposite curvature direction further followed by a second straight section 55 also extending in the direction 'x'. The first curved section 58 has a radius of curvature $R_1$. The second curved section 56 has a radius of curvature $R_2=R_1=R$. In each case, the radius of curvature is measured to a centre line of the core 52. The curved sections 56 and 58 extend through the same angle θ such the respective lengths of the curved sections 56 and 58 are equal. Together the curved sections 56 and 58 make up an S-bend 70. The S-bend 70 provides a lateral offset 'f' in a direction 'y' perpendicular to 'x' between the two straight sections of waveguide 60 and 55. In a specific example, f=20 μm, as measured between the respective centre lines of the waveguide straight sections 55 and 60.

The basic structure of an S-bend is well known. However, the S-bend 70 according to the second embodiment of the invention differs from a conventional waveguide structure in that there is a special shaping and dimensioning of the bend that allows the optical modes to propagate from the first straight-section 60 into the second straight section 55 substantially undistorted. The design rules for shaping and dimensioning the bend are described in detail further below.

The waveguide may be a ridge waveguide as shown in FIG. 5 in relation to the first embodiment. Specifically, FIG. 5 is a cross-section through A-A of FIG. 9 in one example. The same parameter values and variations are envisaged, as discussed in relation to the first embodiment.

The design rules for shaping and dimensioning the S-bend of the second embodiment both for unsymmetrical offset, and also the offset with variable bending radius, are derivable from equations (4) and (5).

For a given offset f, with the equations (1) to (3) and some trigonometry, the couple R, θ is given by $$\begin{cases} R = \frac{1}{2C_1}\left(\frac{(2N\pi)^2}{f} + \sqrt{\frac{(2N\pi)^4}{f^2} - 4C_1 C_2}\right) \\ \theta = \sqrt{\frac{f}{R}} \end{cases} \quad (6)$$

and the offset is long then $L=2\sqrt{fR}$.

The generalization to an offset containing bends of variable bending radius and/or waveguide width is straightforward, and similar to equation (5).

If, instead, the length of the offset if fixed to L, the parameter pair R, θ is given by $$\begin{cases} R = \sqrt{\frac{C_2}{\left(\frac{4N\pi}{L}\right)^2 - C_1}} \\ \theta = \frac{L}{2R} \end{cases} \quad (7)$$

and the obtained offset is $f=L^2/4R$.

In a specific example of an offset between two straight waveguides: R=5 mm, θ=2.26°, N=1, l=197 μm, L=395 μm, f=7.8 μm. The example also assumes the waveguide dimensions and other parameters given for the specific example of FIG. 5. The working point is indicated with a circle in FIG. 6.

The offset in a specific example with unmatched bends is identical, but N=2, θ=3.0°, L=523 μm.

Figure 10:
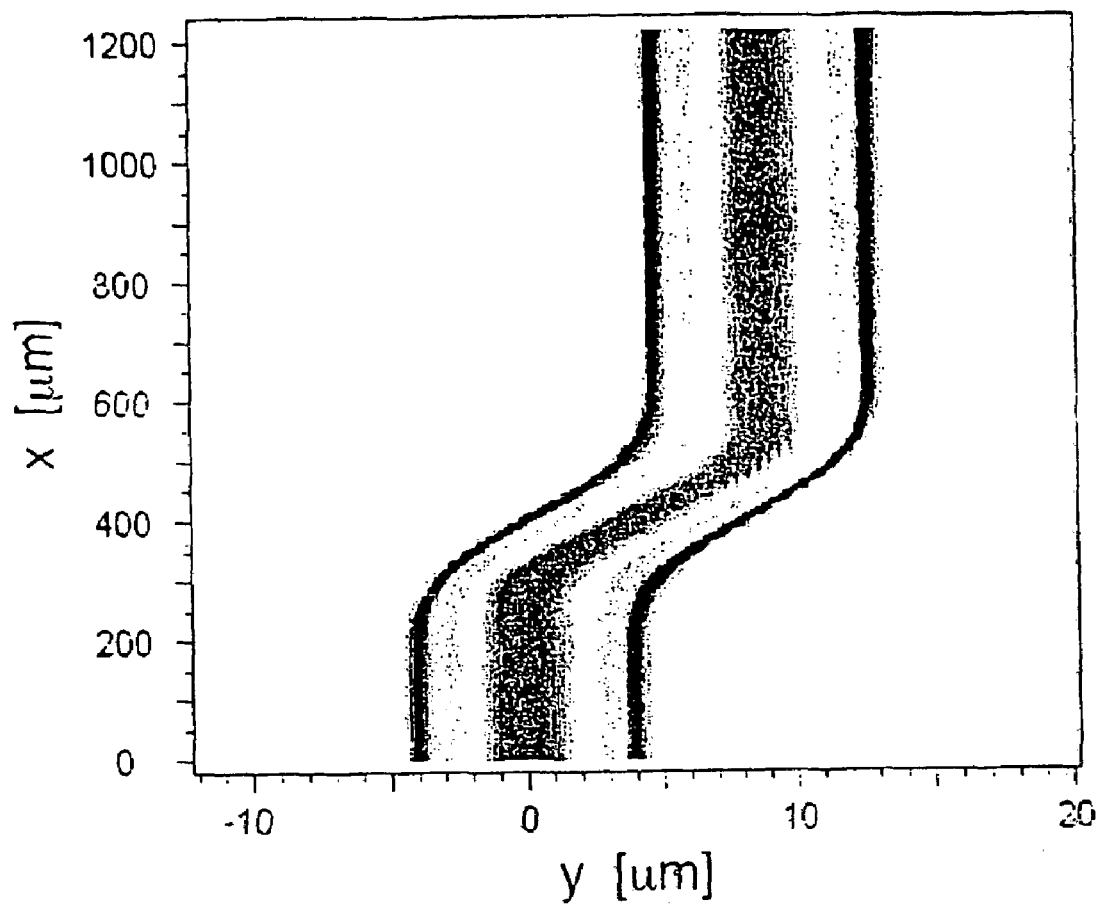
FIG. 10 shows a calculated field intensity pattern for a matched waveguide offset according to the second embodiment.
Figure 11:
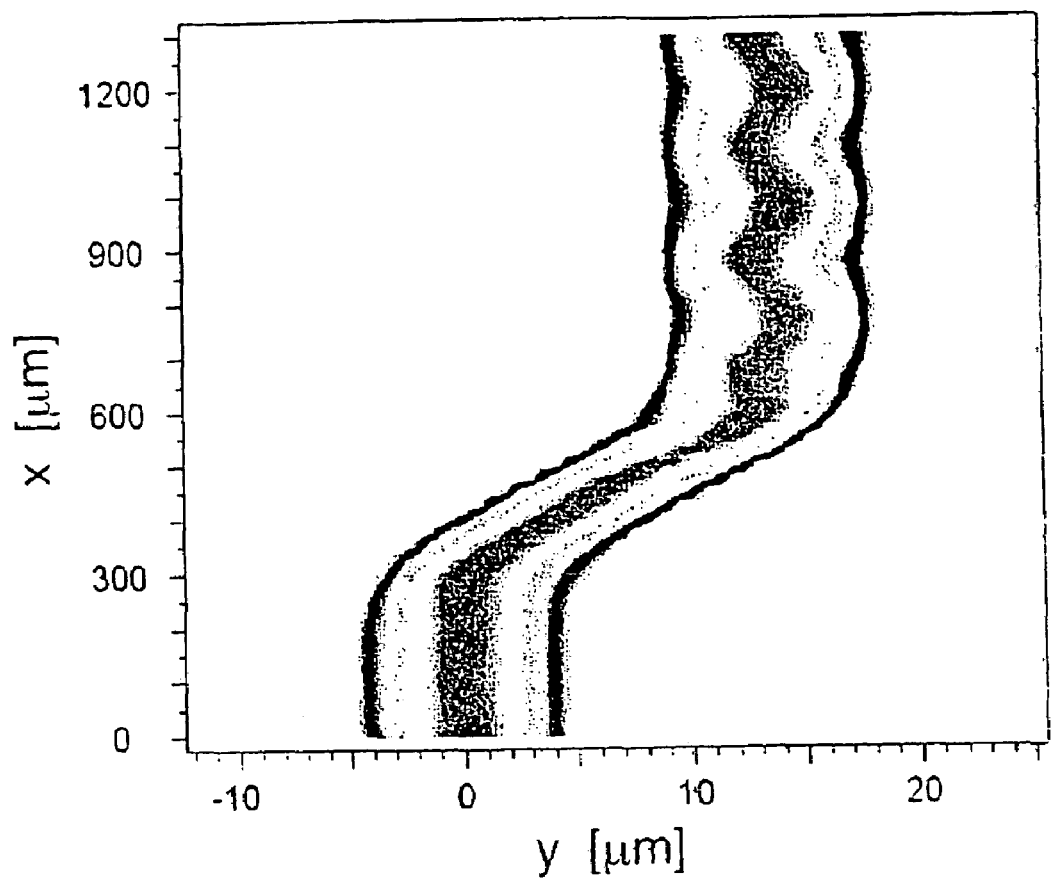
FIG. 11 shows a calculated field intensity pattern for an unmatched waveguide offset for comparison with FIG. 10.

FIGS. 10 and 11 are graphs showing the intensity of the calculated optical field propagating in the two example offsets, FIG. 10 being the matched S-bend and FIG. 11 the unmatched S-bend.

The results are similar to those for the first embodiment in that, for the offset in which the two bends of the S-bend are matched, the mode is seen to reconstruct immediately, substantially without distortion, in the second straight section. On the other hand, for the unmatched structure, the mode is severely distorted subsequent to the curved sections. Similar comments apply as made in relation to the first embodiment. In respect of radiation losses, the offset with matched bends has losses equal to 0.2% (0.009 dB) while the losses of the offset with unmatched bends are 6.2% (0.28 dB).

An important generalization of this embodiment is now discussed. All that is important for matching the S-bend structure, or any bend structure comprising multiple curves, is that at the end of the bend structure the first and second bend modes are substantially in phase with each other having completed an integer number of beats. In the context of the twin-curve structure of the second embodiment, this means that it is not important whether the first and second bend modes are in phase at the end of the first curved section 58, but only important that they are in phase with each other at the end of the bend, i.e. at the end of the second curved section 56. In other words, a matched S-bend can be made up of two appropriately designed "unmatched" curves, instead of two matched curves, as described above. In this respect the two "unmatched" curves may be of different shape (eg. different bending radius) or width (e.g. each with variable widths that are different). Moreover, the input and output straight sections need not be parallel to each other.

THIRD EMBODIMENT

An example of a device that incorporates waveguide bends or offsets is a waveguide coupler. A waveguide coupler may be fabricated by planar, ridge or diffused waveguides for example.

Figure 12:
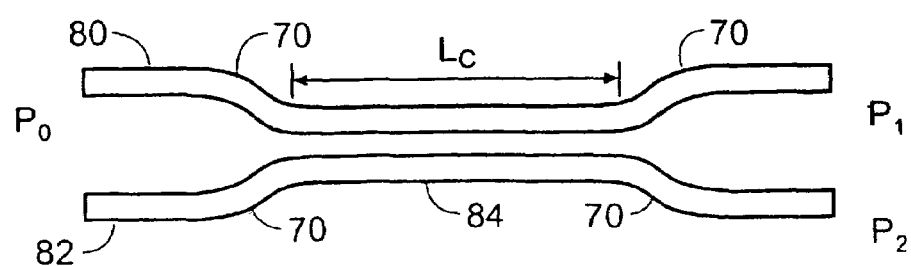
FIG. 12 is a schematic diagram of a waveguide coupler incorporating S-bend offsets of the kind shown in FIG. 9.

FIG. 12 shows a four-port (2×2) waveguide coupler according to a third embodiment of the invention. The coupler comprises first and second waveguides 80 and 82 which approach each other and run alongside each other over a coupling region 84 of length $L_C$ over which modes in the adjacent waveguides can exchange power through evanescent field interaction. The length of the coupling region 84 determines what proportion of input light power $P_0$ travelling in the first waveguide 80 at the start of the coupling region 84 remains in the first waveguide $P_1$ or is transferred into the second waveguide $P_2$ at the end of the coupling region.

A waveguide coupler fabricated on a substrate (as opposed to a fiber coupler) will require waveguide bends at each end of the coupling region. In the illustrated structure, the coupling region is bounded by waveguide offsets 70 according to the second embodiment, there being four in total, two for each waveguide. The design of the offsets can follow the design rules set out for the second embodiment, even if the waveguide portions forming the offset are partially coupled to each other, as will be the case for the waveguide sections immediately adjacent to the coupling regions. (Alternatively, single bends or other multiple bend waveguide shapes could be used).

At one level, the basic power division operation of the coupler is not strongly affected by the waveguide bends bounding the coupling region, since the coupling coefficient (ratio $P_2/P_0$) is relatively insensitive to whether the waveguide bends of the offset are matched or unmatched. However, the higher losses and mode distortion discussed with reference to the previous embodiments will occur. Regarding mode distortion, as discussed further above, and also in reference [6], an unmatched bend results in excitation of a leaky mode (first order mode) which propagates through the coupling region and into the output, causing distortion of the output mode. This will potentially cause problems with subsequent devices, such as a Y-branch, positioned after the coupler.

FOURTH EMBODIMENT

Figure 13:
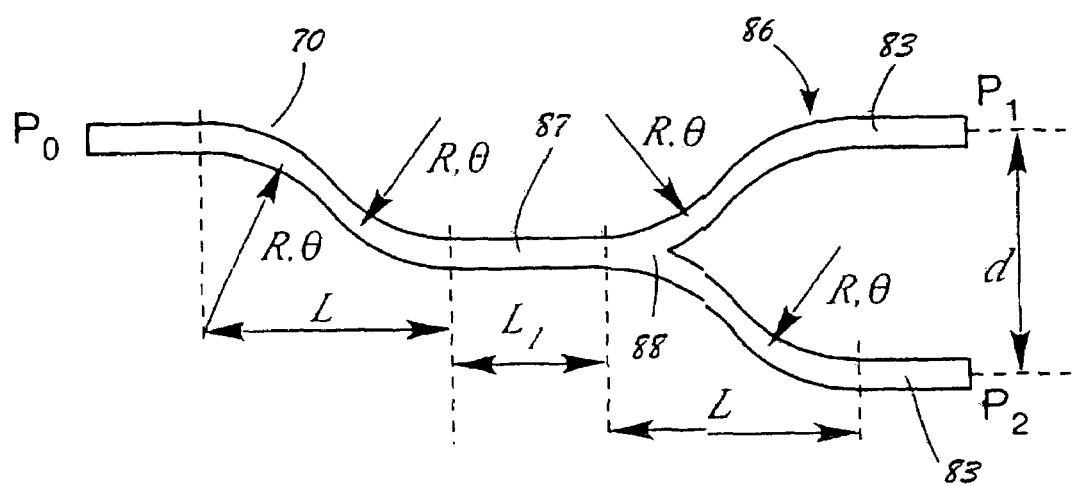
FIG. 13 is a schematic diagram of a third embodiment of the invention showing a Y-branch preceded by a waveguide offset.

FIG. 13 shows a device according to a fourth embodiment. The device is a Y-branch 86 preceded by a matched S-bend offset 70, that is an S-bend that satisfies the above-described matching condition. A Y-branch is used for splitting the power $P_0$ carried in an input waveguide into two output waveguides which carry respective powers $P_1$ and $P_2$. Typically, the Y-branch will be designed to split the power equally, that is so that $P_1=P_2$.

In the illustrated device, the bends of opposite curvature extend over a distance L and are followed by a straight waveguide portion 87 of length $L_1$ which in turn terminates in a waveguide split 88 from which two waveguides 81 and 83 emerge, each extending from the split 88 with an S-bend offset of length L. These offsets are dimensioned to result in the two waveguides emerging from the device separated by a lateral separation d. For the sake of simplicity, the offset lengths, bending radii and bend angles are shown to be the same (L, R and θ) for the various offsets and bends, but of course this will not generally be the case.

Figure 14:
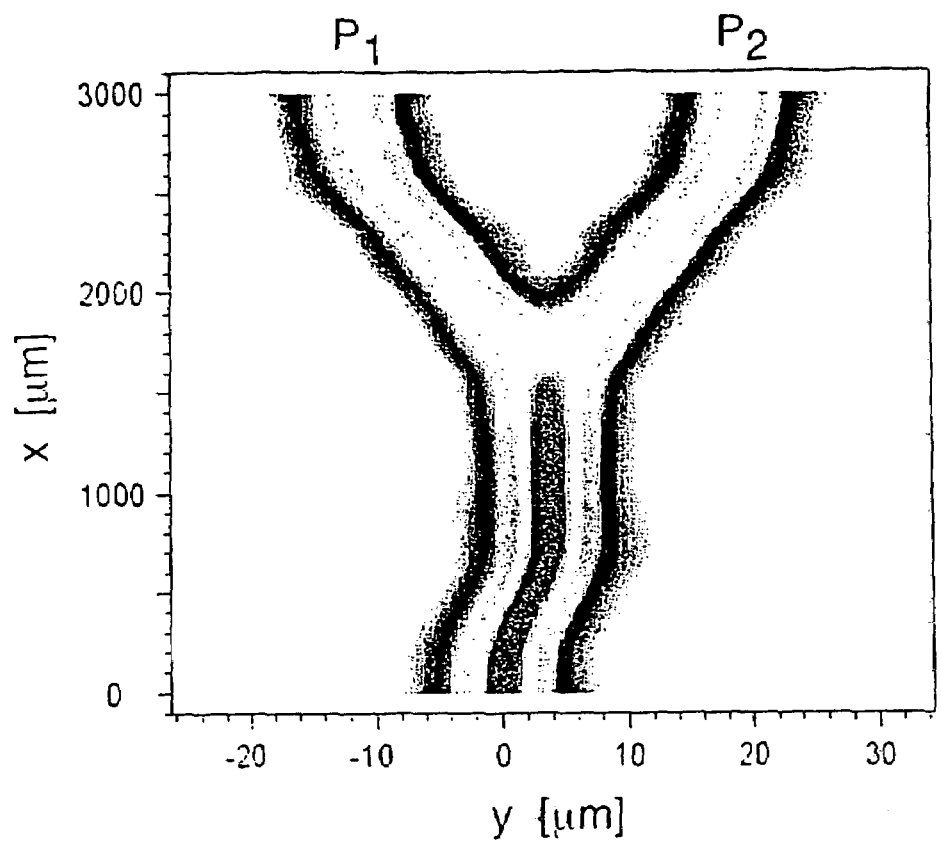
FIG. 14 shows a calculated field intensity pattern for a matched bend structure according to the third embodiment.

FIG. 14 shows a calculated optical field pattern for an example of such a Y-branch. The dimensions of the Y-branch in the example are: L=1.5 mm, waveguide separation d=30 μm, R=5 cm, θ=0.5°. In the example, the waveguides are Ti diffused lithium niobate monomode waveguides with Δn=0.2%, 6 μm width and 3.31 μm height. The offsets are made up of two bends with R=5 cm, θ=0.5° (matched, N=1). The distance between the end of the offset and the Y-splitting point is $L_1$=700 μm.

In the figure, the vertical axis shows propagation direction x and the horizontal axis an orthogonal direction y, both axes being in units of microns. As is evident from the figure, the optical fields in the matched S-bend and the subsequent straight waveguide section at the input are undistorted. This results in undistorted and equal optical fields in the two output waveguide sections. Moreover, although not immediately apparent from the figure, the results show that the output power coupled into each of the output waveguide sections is almost identical. Moreover, full stabilization of the mode power occurs shortly after the Y-split.

Figure 15:
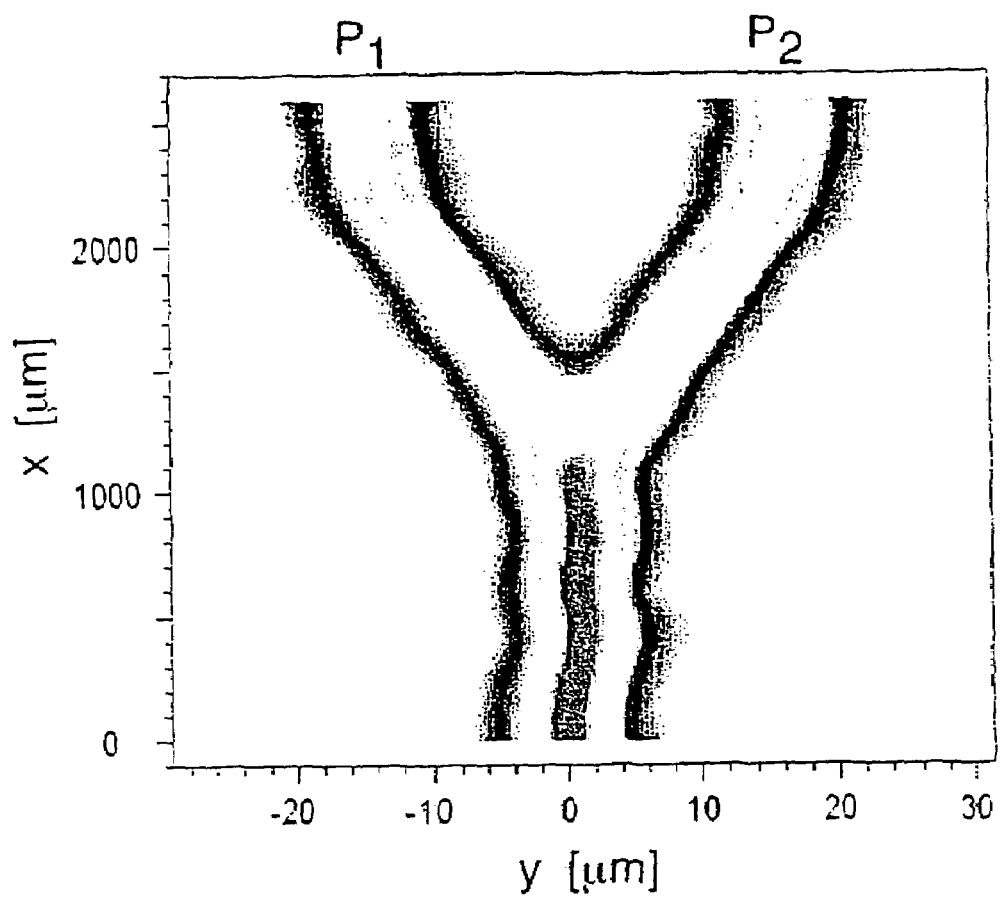
FIG. 15 shows a calculated field intensity pattern for an unmatched bend structure for comparison with FIG. 14.

FIG. 15 is included for comparison with FIG. 14. The results shown are for a Y-branch using similar parameters to the example of the fourth embodiment, but with the offsets being made up of unmatched bends with θ=0.25° (N=0.5).

As is evident from FIG. 15, the optical fields in the unmatched S-bend and the subsequent straight waveguide section at the input are distorted. This results in distorted and unequal optical fields in the two output waveguide sections. Moreover, although not immediately evident from the figure, the results also show that the output power coupled into each of the output waveguide sections differs substantially.

The performance of the example Y-branches with matched and unmatched end offsets is summarized in Table I below.

Referring to the first row of results, when the Y-branch is made with matched bends and preceded by a matched bend offset, the splitting ratio is slightly asymmetrical and the losses are not zero, but relatively low.

Referring to the second row of results, when an unmatched bend Y-branch is preceded by an unmatched bend offset, a large power splitting imbalance occurs. Losses also increase slightly.

TABLE I

| | $P_1$ [%] | $P_2$ [%] | Imbalance | Loss |
|---|---|---|---|---|
| Y-branch with matched offset | 0.500 | 0.494 | 1.17% (0.05 dB) | 0.6% (0.026 dB) |
| Y-branch with unmatched offset | 0.565 | 0.428 | 32.2% (1.2 dB) | 0.7% (0.03 dB) |

In summary, if a Y-branch is to be preceded by a waveguide offset, or other waveguide bend structure, matching the bends according to the design rules set out above can be of vital importance.

FIFTH EMBODIMENT

Figure 16:
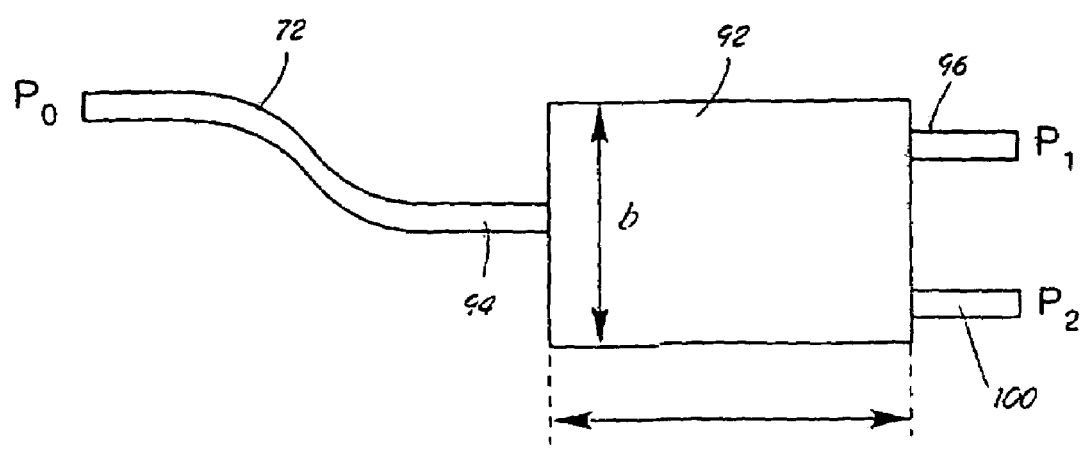
FIG. 16 is a block schematic diagram of a multimode interference (MMI) coupler according to a fifth embodiment of the invention.

FIG. 16 shows a fifth embodiment of the invention comprising a 1×2 multimode interference (MMI) coupler 92 preceded by an S-bend 72 similar to that of the second embodiment. The purpose of this MMI coupler embodiment is to provide a specific example of a device that is sensitive to input mode distortion. A straight input waveguide section 94 interconnects the S-bend 72 with the 1×2 MMI coupler 92. At the output side of the MMI coupler 92 there are provide first and second straight output waveguide sections 96 and 100. The coupling into the straight output waveguide sections 96 and 100 is realized by symmetric interference, as described in reference [7]. The MMI coupler has a length 'c' and a width 'b'.

In an example, the waveguide sections 72, 94, 96 and 100 are buried waveguide sections having a core width w=5.2 μm and a height h=5.2 μm. The refractive index difference between the core and cladding Δn=0.69%. The MMI coupler 92 has a length c=1595 μm and a width b=30 μm. The first straight output waveguide section 96 is placed 8 μm above the centre line of the MMI coupler 92 (as defined by the input waveguide section 94). The second straight output waveguide section 100 is placed 8 μm below the centre line of the MMI coupler 92. The S-bend 72 comprises two matched curves conforming to equation (1) above. The straight section 94 has a length 0 μm, i.e. the MMI coupler 9 follows immediately from the end of the waveguide bend 72. Each curve has a radius of 10 mm and extends through an angle of 1.62°.

With the device, the output powers P1 and P2 coupled into the two output waveguide sections 96 and 100 were calculated, as well as the total transition loss through the coupler and preceding input waveguide sections. For perfect performance, the respective output powers should be equal. In other words a 50:50 power split should be achieved at the output.

By way of comparison with the matched bend example, results were also calculated for a device similar to that of FIG. 16, but with a simple straight input section instead of an S-bend input section (control), and a device similar to that of FIG. 16 but with an unmatched S-bend in the input section (unmatched S-bend). The unmatched S-bend has a bend radius R=10 mm and extends through an angle θ=0.8°. The results are given in Table II below.

TABLE II

| | P1 [%] | P2 [%] | Imbalance [%/dB] | Loss [%/dB] |
|---|---|---|---|---|
| Control | 0.4537 | 0.4536 | 0.02% | 9.3% (0.42 dB) |
| Matched S-bend | 0.4543 | 0.4534 | 0.2% | 9.2% (0.42 dB) |
| Unmatched S-bend | 0.5305 | 0.3485 | 52.2% (1.8 dB) | 12.1% (0.56 dB) |

For the control example, when light enters the MMI coupler through a straight waveguide alone, the input power is equally divided between the two straight output waveguides, as expected.

For the example with a matched S-bend on the input side of the MMI coupler, the splitting ratio between the two output waveguides sections is almost exactly 50:50. In other words, the presence of the matched S-bend on the input has not significantly affected the splitting ratio of the MMI coupler. The total loss is somewhat higher as a result of the S-bend.

For the example with an unmatched S-bend on the input side of the MMI coupler, the power splitting ratio is greatly affected by the mode distortion at the input. There is an imbalance of 1.8 dB (i.e. 52%) between the power coupled into the two output waveguides sections. The total loss is also somewhat higher than for the matched S-bend example.

Figure 17:
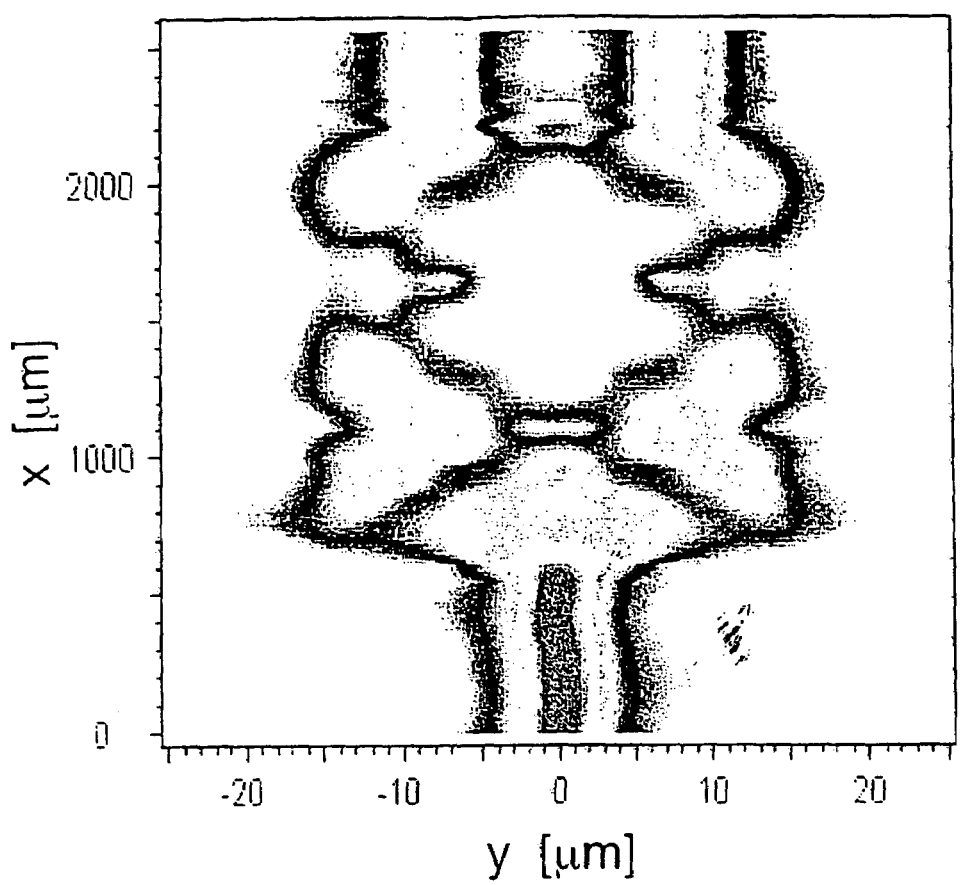
FIG. 17 shows a calculated field intensity pattern for a matched bend MMI coupler according to the fifth embodiment.

FIG. 17 is a calculated optical field intensity pattern for the example of the fifth embodiment. As is evident from the figure, the mode is relatively undistorted at the input to the MMI coupler (0<x<500 μm). The mode pattern is rather complex within the MMI coupler (500<x<2100 μm). At the output waveguide sections (x>2100) the modes are relatively undistorted already after only about 100 μm of propagation in the output channels. The power balance between the two channels is also even (although not immediately apparent from the figure). Namely, after a propagation distance of 2150 μm, i.e. a short distance into the straight output waveguides, the power split is nearly equal.

Figure 18:
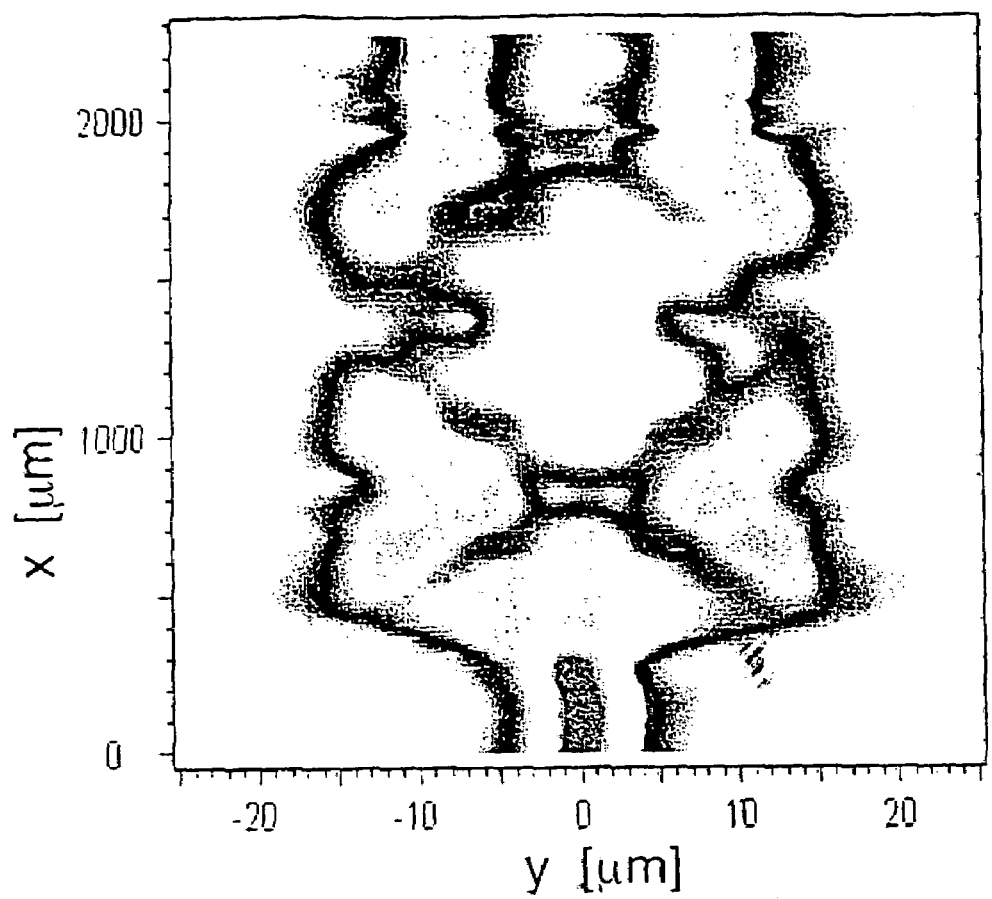
FIG. 18 shows a calculated field intensity pattern for an unmatched bend MMI coupler for comparison with FIG. 17.

FIG. 18, by way of comparison, is a calculated optical field intensity pattern for an MMI coupler similar to that of the example, but preceded by an unmatched S-bend. As is evident from the figure, the mode is somewhat distorted at the input to the MMI coupler (0<x<500 μm). The mode pattern is rather complex within the MMI coupler (500<x<2100 μm). At the output waveguide sections (x>2100) the modes are highly distorted and a large power imbalance is also evident. The relative power imbalance is approximately 0.53/0.35.

SIXTH EMBODIMENT

Figure 19:
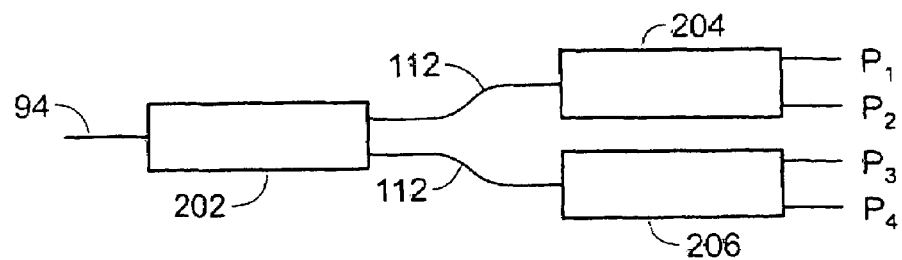
FIG. 19 is a schematic diagram of a 1×4 power splitter based on cascaded multimode interference (MMI) couplers according to a sixth embodiment of the invention.

FIG. 19 is a block schematic drawing of a sixth embodiment of the invention. The sixth embodiment is a 1×4 power splitter realized by cascading three 1×2 MMI couplers 202, 204 and 206 in two stages. A first MMI coupler 202 has a straight input waveguide 94. The first MMI coupler 202 has two output waveguides in the form of matched S-bends 112. The S-bends 112 extend to form respective inputs for second and third MMI couplers 204 and 206. The second MMI coupler 204 has two straight output waveguide sections that carry output powers P1 and P2 in use. The third MMI coupler has two straight output waveguide sections that carry output powers P3 and P4 in use.

The waveguide and MMI coupler dimensions are the same as for the fifth embodiment described above. The bend radius R of the two S-bends 112 that connect the MMI couplers 202, 204 and 206 is R=20 mm and the angle of curvature of the curved sections is θ=0.8°.

The calculated power imbalance between the four output powers P1-P4 is only 0.006 dB or 0.1%.

By comparison, in an example in which the S-bends interconnecting the first and second stages of the device are unmatched (R=20 mm, θ=0.4°), the calculated power imbalance is much higher, namely 0.61 dB or 15.1%.

It is thus evident that power splitters based on MMI couplers are sensitive to optical field distortions so that the provision of matched bends greatly improves performance. The improvement becomes more significant as the number of stages of such a power splitter increases. For example, the benefit of providing matched bends becomes greater as one progresses from a three stage 1×8 splitter, to a four stage 1×16 splitter, a five stage 1×32 splitter or, more generally, to an n-stage 1×$2^n$ splitter.

Similar results are found for single stage or multi-stage cascaded Y-branch power splitters, i.e. an n-stage 1×$2^n$ splitter.

In cascaded Y-branch or MMI coupler devices implemented in planar waveguide technology, bends cannot usually be avoided, so the provision of matched bends interconnecting the different stages of the cascade provides a major improvement, especially for multiple stage devices.

SEVENTH EMBODIMENT

Figure 20:
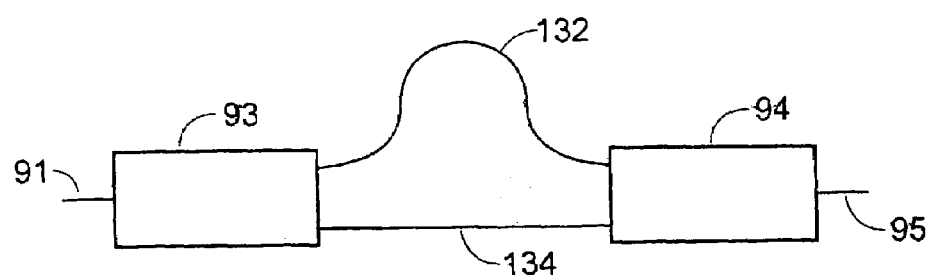
FIG. 20 is a schematic diagram of a Mach-Zehnder filter device according to a seventh embodiment of the invention.
Figure 21:
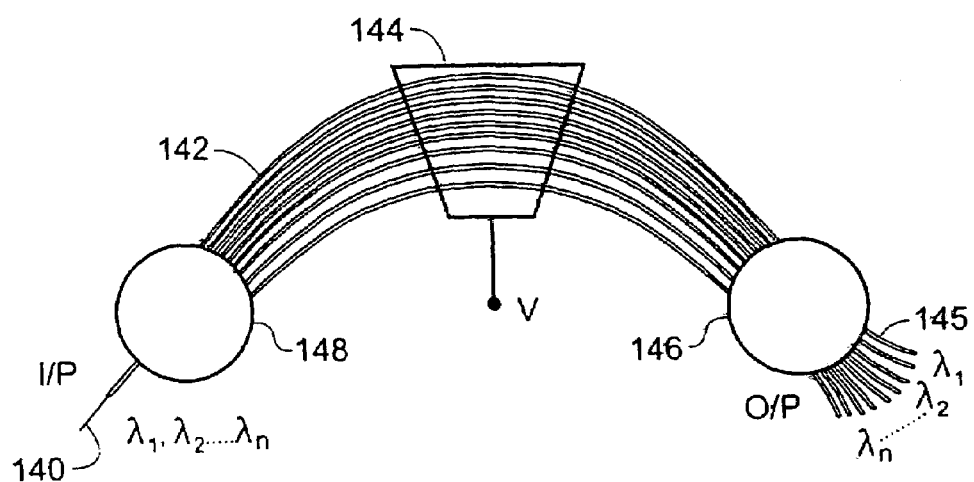
FIG. 21 is a schematic diagram of an arrayed wave guide grating (AWG) device according to an eighth embodiment of the invention.

FIG. 20 relates to a seventh embodiment of the invention showing a Mach-Zehnder filter comprising first and second MMI couplers 93 and 94 having straight input and output waveguides 91 and 95 interconnected by first and second waveguide sections 132 and 134 of different optical path length which constitute first and second arms of the Mach-Zehnder filter. The first arm 132 is bent to increase its optical path length and thus introduce the optical path difference between the two arms. More specifically, the first arm 132 comprises four curved waveguide sections. The waveguides and MMI couplers are as for the fifth embodiment.

In an example of this embodiment, the curved sections of the first arm each have a constant radius or curvature R=7 mm and extend through an angle θ=2.3° which complies with the matching condition of equation (1). The waveguides are buried waveguides with core cross-section dimensions of 5.2 μm square and core/clad refractive index difference Δn=0.69%. In this case the extinction ratio of the device is 42 dB. Extinction ratio is a measure of goodness of a Mach-Zehnder filter.

By way of comparison, if the curves are unmatched with R=7 mm and θ=1.3°, the extinction ratio worsens to 21 dB.

If the angle of curvature is increased beyond the optimum matched value of θ=2.3° for R=7 mm, the extinction ratio deteriorates even further.

Similar results are obtained when Y-branches are used in place of MMI couplers in a Mach-Zehnder filter, and for Mach-Zehnder modulators.

In simulations of an example of this embodiment, there is some variation in the output power with propagation distance, but the variation is less than 10%. By comparison, simulations of a similar device with unmatched bends show an output intensity that wildly oscillates with propagation distance. This difference in performance is attributed to the different levels of distortion in the mode entering the second MMI coupler 94 from the first (bent) arm 132.

Finally, it is noted that similar results are found for a Mach-Zehnder interferometer fabricated with input and output side Y-branches, and for a device in which the MMI couplers are replaced with waveguide couplers.

EIGHTH EMBODIMENT

Figure 22:
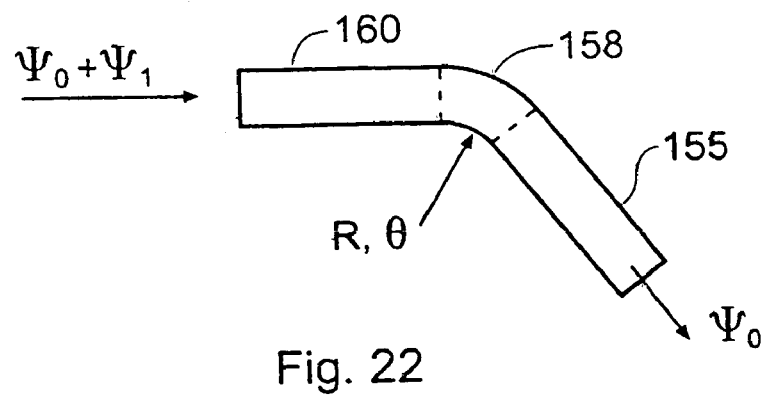
FIG. 22 is a schematic diagram of a mode converter according to a ninth embodiment of the invention.

FIG. 22 is a schematic plan view of an active arrayed waveguide grating (AWG) according to an eighth embodiment of the invention. The device comprises an array of waveguides 142 interconnecting first and second free space propagation regions 148 and 146, successive waveguides of the array having an incrementally increasing optical path length, as is known in the art, for example reference [4]. In contrast to a conventional AWG, the waveguides of the array 142 interconnecting the free space propagation regions are additionally matched according to the generalised form of the design equations given above for non-arcuate curves, it being understood that the waveguides of the array 142 will not be simple arcuate curves in an AWG. The waveguides of the array 142 are thus not only matched in terms of their optical path lengths, as in a conventional AWG, but additionally matched in terms of the beat length between the bend modes, according to the invention. In input waveguide 140 couples into the first free space propagation region 148 and a plurality of output waveguides 145 couple out from the second free space propagation region 146. The waveguide array 142 has arranged thereon a trapezoidal electrode 144 biased in use by a voltage V for imposing a linear phase profile on the waveguide array 142, thereby to tune the device so that a given input wavelength from the input waveguide 140 can be coupled to different ones of the output waveguides 145. The inclusion of the electrode 144 provides an active AWG. Omission of the electrode is also possible to provide a passive AWG.

NINTH EMBODIMENT

FIG. 22 is a schematic diagram of a mode converter according to an ninth embodiment of the invention.

The above-described analysis of bent waveguides is not only applicable to designing matched waveguide bends, but also permits the design of a mode converter.

As explained above, and also in reference [6], the field of a monomode bent waveguide can be described as the linear combination of the fundamental mode and the first leaky mode of the straight waveguide. By the same token, the field of a monomode straight waveguide can be described as the linear combination of the fundamental mode and the first leaky mode of a bent waveguide. This can be mathematically expressed by:

$$\begin{cases} \Theta_0(x, y) = a_{00}\Psi_0(x, y) + a_{01}\Psi_1(x, y) \\ \Theta_1(x, y) = a_{10}\Psi_0(x, y) + a_{11}\Psi_1(x, y) \end{cases} \quad (8)$$

where $\Psi_{0,1}$ are respectively the fundamental mode and the first leaky mode of the straight waveguide, and $\Theta_{0,1}$ are respectively the fundamental mode and the first leaky mode of the bent waveguide. The complex coefficients $\alpha_{ij}$ are the modal coefficients and are described further in reference [6].

In FIG. 22, there is shown a single bend structure, generally similar to that of FIG. 4, comprising a first straight section 160 followed by a curved section 158 (defined by parameters R, θ) and a second straight section 155.

In the first straight waveguide section 160, an optical signal is shown propagating towards the bend, the signal having components of both straight modes $\Psi_0$ and $\Psi_1$. The bend is structured and dimensioned to provide mode conversion so that, after the bend, i.e. at the output of the device, only the fundamental straight mode $\Psi_0$ is present. The device is thus a mode converter because it converts all the power of the $\Psi_1$ mode to the $\Psi_0$ mode. Using the language of the previous embodiments, the bend is "unmatched" (but in a special way) in order to carry out the required mode conversion. The output field $\Psi_{OUT}$ can be written as $$\Psi_{OUT} = APA^{-1}\Psi_{IN}S\Psi_{IN} \quad (9)$$

where $\Psi_{IN}$ is the vector of the input modes, A is the square matrix with coefficients $\alpha_{ij}$ and P is the matrix describing the propagation in the bent waveguide:

$$P = \begin{bmatrix} \exp(-j\beta_{B0}R\theta) & 0 \\ 0 & \exp(-j\beta_{B1}R\theta) \end{bmatrix}. \quad (10)$$

If the amplitudes and the phases of the input straight modes are known, the radius R and the angle θ needed for the bend 158 of the mode converter are found by imposing in equation (9) that $$\Psi_{OUT} = \begin{bmatrix} \Psi_0(x, y) \\ 0 \end{bmatrix}. \quad (11)$$

The mode converter is a useful device, since it is generally important that substantially all the power of an optical signal is in the fundamental mode. Power in the first leaky mode is undesirable, because of the radiative losses associated with that mode. The mode converter can, for example, be used as a component of an optical integrated circuit. Suppose that at an arbitrary point along a waveguide in an optical integrated circuit, it can be predicted that a proportion of the optical signal power will be in the first leaky mode (e.g. at the output of a certain kind of device) and the phase is defined. It will then be possible to insert a mode converter according to this embodiment to convert all the power back into the fundamental mode.

Figure 23:
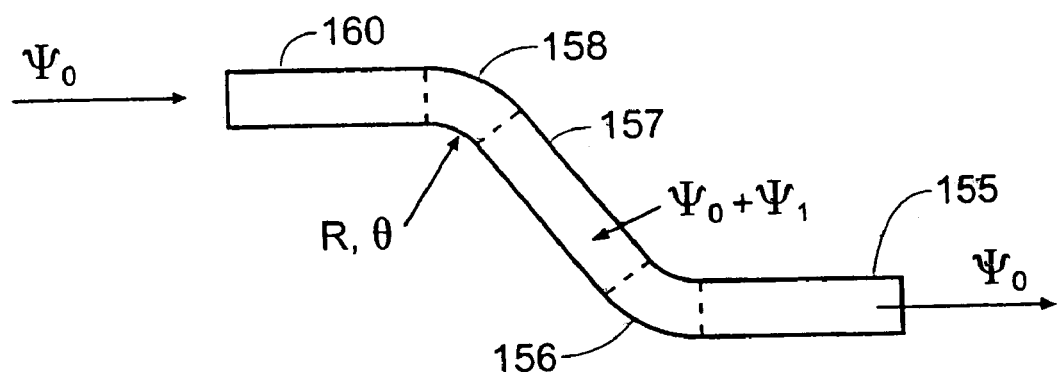
FIG. 23 is a schematic diagram of an example mode converter according to the ninth embodiment.

FIG. 23 shows an example of the use of a mode converter. A straight waveguide section 160 is connected to an arbitrarily unmatched bent waveguide section 158 with R=2 mm and θ=2.86°, connected in turn to a straight waveguide section 157 that is 150 µm long. (The waveguide is a ridge waveguide similar to that shown in FIG. 5 but without an upper cladding). The input field in the input straight section 160 is $\Psi_0$ and the output field after the unmatched bend 158 in the straight section 157 is 90.72% of $\Psi_0$ and 9.24% of $\Psi_1$.

However, if an appropriate mode converting bent waveguide is connected to this structure, all the power can be reconverted to the fundamental mode only and the output field is undistorted. With the technique explained above (equations 9 to 11) the bent waveguide acts as mode converter. This has a bending radius of −300 µm (the sign minus means that the direction is opposite to the previous waveguide), θ=1.72° and its length is therefore only 9 µm. The total losses of the whole structure are below 0.1%. The mode converter is very short.

In general, it is possible to design a mode converter using the above-described design rules to convert an input mode with mixed $\Psi_0$ and $\Psi_1$ contributions into an output mode purely with a $\Psi_0$ contribution, whatever the ratio between the strengths of the two modes $\Psi_0$ and $\Psi_1$.

Finally, it will be appreciated that a mode converter may be made of multiple curved sections, not just the single curve shown.

Closing Remarks

All the powers (and intensities) mentioned in the above description refer to the power of the first order (or fundamental) mode. Mathematically speaking, this power corresponds to the overlap integral between the transverse electric field present in the waveguide and the field of the fundamental mode of the same waveguide. This is an important point as all the techniques are based on the mode expansion of the waveguide field.

In all the examples given above, the waveguides are monomode. The proposed approach including the design rule formulae stated above are also valid if the waveguide is multimode in the vertical direction. The principle of the invention is also still valid more generally for multimode waveguides. For bimodal waveguides, the closed-form formulae for the optimum bend and offset are still valid. For other multimode waveguides, the principles are still valid, but closed-form formulae do not exist.

REFERENCES

[1] Neuman, Proc. IEE Journal, vol. 129, pages 278-280 (1982)
[2] Kitoh et. al., Journal of Lightwave Technology vol. 13, pages 555-562 (1995)
[3] Hirono et al, IEEE Photonics Technology Letters vol. 10, pages 982-984 (1998)
[4] U.S. Pat. No. 5,243,672 (Dragone)
[5] Melloni et al, Proc. LEOS '99 pages 641-42 (1999)
[6] Melloni et al, Journal of Lightwave Technology, vol. 19, issue 4 (April 2001)
[7] Soldano, Journal of Lightwave Technology vol. 13, pages 615-627 (1995)

These documents are referenced above and incorporated herein by reference in their entirety.

The invention claimed is:

1. A waveguide for guiding an optical field therealong, the waveguide comprising a bend bounded by an input end and an output end, wherein the field in the bend is characterized by first and second bend modes which are in phase at the input end but propagate at different velocities through the bend, thereby coming out of phase and into phase with each other in beats, wherein the bend is structured having regard to its length and curvature to ensure that at the output end the first and second bend modes are substantially in phase with each other having completed approximately an integer number of beats over a desired wavelength range of the optical field, wherein said desired wavelength range is in the second or in the third telecommunications windows.

2. The waveguide according to claim 1, wherein the first and second bend modes have a phase mismatch of less than one of 30, 20, 10, 5, 2 and 1 degrees at the output end of the bend over the desired wavelength range.

3. The waveguide according to claim 1, wherein the bend comprises a plurality of curved portions.

4. The waveguide according to claim 3, wherein the bend comprises at least one substantially straight portion intermediate between adjacent curved portions.

5. The waveguide according to claim 3, wherein at least first and second ones of the curved portions are oppositely curved.

6. The waveguide according to claim 5, wherein the bend provides a lateral offset between two components aligned substantially in parallel with each other.

7. The waveguide according to claim 5, wherein the bend provides a lateral offset between substantially straight portions that are substantially parallel to each other.

8. The waveguide according to claim 5, wherein the bend provides a lateral offset between a substantially straight portion and a component aligned substantially in parallel therewith.

9. The waveguide according to any one of claims 6 to 8, wherein the substantially straight portion has no curve with a radius of curvature of less than one of 20, 30, 40, 50 and 100 cm.

10. The waveguide according to claim 3, wherein the plurality of curved portions comprise first and second curved portions having respective sets of parameters including shape and dimension, wherein the respective sets of parameters of the first and second curved portions differ.

11. The waveguide according to claim 1, wherein a Mach-Zehnder interferometer device comprises a first arm and a second arm and at least the first arm comprises the waveguide.

12. The waveguide according to claim 1, wherein a waveguide branch comprises an input waveguide and at least two output waveguides and the input waveguide comprises the waveguide according to claim 1.

13. The waveguide according to claim 1, wherein a waveguide branch comprises an input waveguide and first and second output waveguides and at least one of the first and second output waveguides comprises the waveguide according to claim 1.

14. The waveguide according to claim 1, wherein the waveguide is connected to an input of a multimode interference coupler.

15. The waveguide according to claim 1, wherein a device comprises first and second waveguides that differ in their respective lengths and/or curvatures and at least one of the first and second waveguides comprises the waveguide according to claim 1.

16. the waveguide according to claim 1, wherein the waveguide is included in an arm of an arrayed waveguide grating.

17. The waveguide according to claim 1, wherein the waveguide is connected to an input of an arrayed waveguide grating.

18. The waveguide according to claim 1, wherein a waveguide coupler comprises first and second waveguides which extend proximal to each other to form a coupling region having first and second ends, at least one of the first and second waveguides comprise the waveguide according to claim 1, the first and second waveguides having bends in order to diverge from each other at the first and second ends of the coupling region.

19. The waveguide according to claim 1, wherein the waveguide is connected to an input of an optical component adapted to receive an optical signal.

20. The waveguide according to claim 19, wherein the optical component is of a type that is sensitive to mode distortion at the input.

21. The waveguide according to claim 1, wherein a mode converter comprises the waveguide.

22. The waveguide according to claim 1, wherein the first bend mode is a fundamental mode and the second bend mode is a leaky mode such that the bend is structured having regard to its length and curvature to convert an optical field received at the input end with a predictable ratio of a first power portion in the fundamental mode to a second power portion in the leaky mode into an optical field at the output end in which substantially all the power is in the fundamental mode and substantially none in the leaky mode.

23. A waveguide for guiding an optical field therealong, the waveguide comprising a bend bounded by an input end and an output end, wherein the field in the bend is characterized by first and second bend modes which are in phase at the input end but propagate at different velocities through the bend, thereby coming out of phase and into phase with each other in beats, wherein the bend is structured having regard to its length and curvature to ensure that at the output end the first and second bend modes are substantially in phase with each other having completed approximately an integer number of beats over a desired wavelength range of the optical field, wherein the bend has a radius of curvature R that is variable along the bend as a function of angle θ, where the bend substantially satisfies a matching condition:

$$\int_{-\theta/2}^{\theta/2} \sqrt{R^2(\theta)C_1 + C_2}\, d\theta = 2N\pi$$

where $C_1 = (\beta_0 - \beta_1)^2$;

$C_2 = 4\beta_0\beta_1 c_{10}^2$;

$\beta_0$ and $\beta_1$ are respective phase constants of first and second straight modes; $c_{10}$ is a coupling coefficient indicative of coupling induced by the bend between the first and second straight modes; and N is the integer number of beats.

24. A waveguide for guiding an optical field therealong, the waveguide comprising a bend bounded by an input end and an output end, wherein the field in the bend is characterized by first and second bend modes which are in phase at the input end but propagate at different velocities through the bend, thereby coming out of phase and into phase with each other in beats, wherein the bend is structured having regard to its length and curvature to ensure that at the output end the first and second bend modes are substantially in phase with each other having completed approximately an integer number of beats over a desired wavelength range of the optical field, wherein the bend has at least one arcuate portion having radius of curvature R and describing an angle θ, where the arcuate portion substantially satisfied a matching condition:

$$R = \sqrt{\frac{\left(\frac{2N\pi}{\theta}\right)^2 - C_2}{C_1}}$$

where $C_1 = (\beta_0 - \beta_1)^2$;

$C_2 = 4\beta_0\beta_1 c_{10}^2$;

$\beta_0$ and $\beta_1$ are respective phase constants of first and second straight modes;

$c_{10}$ is a coupling coefficient indicative of coupling induced by the bend between the first and second straight modes; and N is the integer number of beats.

25. The waveguide according to claim 23 or 24, wherein the matching condition is substantially satisfied when N is within one of 10%, 8%, 6%, 4%, 2%, 1%, 0.5% and 0.25% of an integer value over the desired wavelength range.

26. A waveguide for guiding an optical field therealong, the waveguide comprising a substantially straight portion and a bend including at least one curved portion, said at least one curved portion following said substantially straight portion, the bend being bounded by an input end corresponding to an end of the substantially straight portion and an output end, wherein the optical field in the bend has a first bend mode and a second bend mode, the first bend mode being a fundamental bend mode and the second bend mode being a first leaky bend mode, the first and second bend modes are in phase at the input end but propagate at different velocities through the bend, thereby coming out of phase and into phase with each other in beats, and the bend is structured having regard to its length and curvature to ensure that at the output end the first and second bend modes are substantially in phase with each other having completed approximately an integer number of beats over a predetermined wavelength range of the optical field, wherein said predetermined wavelength range is in the second or in the third telecommunications windows.

27. The waveguide of claim 26, wherein said predetermined wavelength range is of 100 nm in the second or in the third telecommunications windows.

28. The waveguide according to claim 26, wherein the optical field in the bend has a first bend mode with a first phase constant ($\beta_{B0}$) and a second bend mode with a second phase constant ($\beta_{B1}$) and wherein the length of the bend is approximately equal to an integer number (N) of beat lengths ($L_b$), with the beat length ($L_b$) being equal to $2\pi/(\beta_{B0}-\beta_{B1})$.

* * * * *

UNITED STATES PATENT AND TRADEMARK OFFICE
CERTIFICATE OF CORRECTION

PATENT NO. : 7,302,135 B2
APPLICATION NO. : 10/479579
DATED : November 27, 2007
INVENTOR(S) : Melloni et al.

It is certified that error appears in the above-identified patent and that said Letters Patent is hereby corrected as shown below:

Claim 23, column 20, line 29, "$C_2 = 4\beta_0\beta_1 c^2{}_{10}$;" should read --$C_2 = 4\beta_0\beta_1 c_{10}{}^2$;--.

Claim 24, column 20, line 63, "$C_2 = 4\beta_0\beta_1 c^2{}_{10}$;" should read --$C_2 = 4\beta_0\beta_1 c_{10}{}^2$;--.

Signed and Sealed this

Seventeenth Day of June, 2008

JON W. DUDAS
*Director of the United States Patent and Trademark Office*